(12) United States Patent
da Trindade et al.

(10) Patent No.: US 11,275,735 B2
(45) Date of Patent: Mar. 15, 2022

(54) MATERIALIZED GRAPH VIEWS FOR EFFICIENT GRAPH ANALYSIS

(71) Applicant: Microsoft Technology Licensing, LLC, Redmond, WA (US)

(72) Inventors: Joana Matos Fonseca da Trindade, Cambridge, MA (US); Konstantinos Karanasos, San Francisco, CA (US); Carlo Aldo Curino, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 271 days.

(21) Appl. No.: 16/277,992

(22) Filed: Feb. 15, 2019

(65) Prior Publication Data

US 2020/0265049 A1 Aug. 20, 2020

(51) Int. Cl.
*G06F 16/30* (2019.01)
*G06F 16/2453* (2019.01)
*G06F 16/901* (2019.01)
*G06T 11/20* (2006.01)

(52) U.S. Cl.
CPC .. *G06F 16/24545* (2019.01); *G06F 16/24539* (2019.01); *G06F 16/9024* (2019.01); *G06T 11/206* (2013.01)

(58) Field of Classification Search
CPC ......... G06F 16/24545; G06F 16/24539; G06F 16/6024; G06F 16/0335; G06F 16/212; G06F 16/27; G06F 16/2471
USPC ........ 707/609, 698, 705, 769, 790, 813, 821
See application file for complete search history.

(56) References Cited

U.S. PATENT DOCUMENTS

| | | | | |
|---|---|---|---|---|
| 2014/0317085 | A1* | 10/2014 | Wehrmeister | G06F 16/24544 707/714 |
| 2015/0026158 | A1* | 1/2015 | Jin | G06F 16/90335 707/722 |
| 2015/0032722 | A1* | 1/2015 | Al-Omari | G06F 16/24542 707/718 |

(Continued)

OTHER PUBLICATIONS

Database Graph views 1994.*

(Continued)

*Primary Examiner* — Sana A Al-Hashemi
(74) *Attorney, Agent, or Firm* — Fiala & Weaver P.L.L.C.

(57) ABSTRACT

Methods, systems, and computer program products are provided for generating and utilizing materialized graph views. A system according to one embodiment includes a graph database including a graph and schema, a workload analyzer, a view enumerator, a query rewriter and an execution engine. The workload analyzer is configured to receive and analyze queries in a query workload. The view enumerator is configured to use an inference engine to operate on facts derived from the graph and a query, and view templates comprising inference rules to enumerate candidate views. The workload analyzer is further configured to selects a candidate view to materialize, provide the selected view to the execution engine that is configured to generate the materialized view. The workload analyzer may select the at least one candidate view based on factors such as query evaluation cost estimates, candidate view performance improvement estimates, view size estimates and view creation cost estimates.

20 Claims, 7 Drawing Sheets

(56) References Cited

U.S. PATENT DOCUMENTS

| | | | | |
|---|---|---|---|---|
| 2015/0286684 | A1* | 10/2015 | Heinz | G06F 16/9024 |
| | | | | 707/769 |
| 2016/0154634 | A1* | 6/2016 | Simitsis | G06F 9/44 |
| | | | | 717/156 |
| 2018/0173727 | A1 | 6/2018 | Kreutzer et al. | |
| 2019/0318025 | A1* | 10/2019 | Jindal | G06F 16/24542 |

OTHER PUBLICATIONS

Low, et al., "GraphLab: A New Framework For Parallel Machine Learning", Retrieved from: https://arxiv.org/ftp/arxiv/papers/1408/1408.2041.pdf, Aug. 2014, 10 Pages.

Maccioni, et al., "Scalable Pattern Matching over Compressed Graphs via Dedensification", In Proceedings of the 22nd ACM SIGKDD International Conference on Knowledge Discovery and Data Mining, Aug. 13, 2016, pp. 1755-1764.

Macko, et al., "Provenance for the Cloud", In Proceedings of the 8th USENIX conference on File and storage technologies, Feb. 23, 2010, pp. 15-14.

Malewicz, et al., "Pregel: A System for Large-scale Graph Processing", In Proceedings of the ACM SIGMOD International Conference on Management of data, Jun. 6, 2010, pp. 135-146.

Mavlyutov, et al., "Dependency-Driven Analytics: A Compass for Uncharted Data Oceans", In Proceedings of 8th Biennial Conference on Innovative Data Systems Research, Jan. 8, 2017, 9 Pages.

McCune, et al., "Thinking Like a Vertex: A Survey of Vertex-Centric Frameworks for Large-Scale Distributed Graph Processing", In Journal of ACM Computing Surveys (CSUR) vol. 48, Issue 2, Article No. 25, Nov. 2015, 39 Pages.

McSherry, et al., "Scalability! But at what COST?", In Proceedings of the 15th US EN IX conference on Hot Topics in Operating Systems, May 2015, 6 Pages.

Meier, Michael, "The backchase revisited", The International Journal on Very Large Data Bases vol. 23, Issue 3, Jun. 2014, pp. 495-516.

Muniswamy-Reddy, et al., "Provenance-Aware Storage Systems", In Proceedings of USENIX Annual Technical Conference, General Track, Jun. 2006, 14 Pages.

Murray, et al., "Naiad: a timely dataflow system", In Proceedings of the Twenty-Fourth ACM Symposium on Operating Systems Principles, Nov. 3, 2013, pp. 439-455.

Navlakha, et al., "Graph summarization with bounded error", In Proceedings of ACM SIGMOD international conference on Management of data, Jun. 9, 2008, 13 Pages.

Psallidas, et al., "Smoke: Fine-grained Lineage at Interactive Speed", In Proceedings of the VLDB Endowment vol. 11, Issue 6, Feb. 2018, pp. 719-732.

Yan, et al., "Pregel Algorithms for Graph Connectivity Problems with Performance Guarantees", In Proceedings of the VLDB Endowment vol. 7, Issue 14, Oct. 2014, pp. 1821-1832.

Rest, et al., "PGQL: A Property Graph Query Language", In Proceedings of the Fourth International Workshop on Graph Data Management Experience and Systems, Jun. 24, 2016, 6 Pages.

Roy, et al., "Efficient and extensible algorithms for multi query optimization", In Proceedings of the ACM SIGMOD International conference on Management of data, May 15, 2000, pp. 249-260.

Rudolf, et al., "SynopSys: Large Graph Analytics in the SAP HANA Database Through Summarization", In Proceeding First International Workshop on Graph Data Management Experiences and System, Jun. 23, 2013, 06 Pages.

Sellis, Timos K . . . , "Multiple-query optimization", In Journal of ACM Transactions on Database Systems, vol. 13, Issue 1, Mar. 1988, pp. 23-52.

Shun, et al., "Ligra: A Lightweight Graph Processing Framework for Shared Memory", In Proceedings of the 18th ACM SIGPLAN symposium on Principles and practice of parallel programming, Feb. 23, 2013, 12 Pages.

Shun, et al., "Smaller and Faster: Parallel Processing of Compressed Graphs with Ligra+", In Proceedinds of Data Compression Conference, Apr. 7, 2015, pp. 403-412.

Suchanek, et al., "Yago: A Core of Semantic Knowledge Unifying Wordnet and Wikipedia", In Proceedings of the 16th International Conference on World Wide Web, May 8, 2007, pp. 697-706.

Sundaram, "GraphMat: High Performance Graph Analytics Made Productive", In Proceedings of the VLDB Endowment vol. 8, Issue 11, Jul. 1, 2015, pp. 1214-1225.

Tang, et al., "Graph Stream Summarization: From Big Bang to Big Crunch", In Proceedings of the International Conference on Management of Data, Jun. 26, 2016, pp. 1481-1496.

Trindade, et al., "Kaskade: Graph Views for Efficient Graph Analytics", In Proceedings of the VLDB Endowment, vol. 11, No. 5, Aug. 2018, 14 Pages.

Trindade, et al., "Kaskade: Graph Views for Efficient Graph Analytics", In Proceedings of ACM Conference, Jul. 2017, 17 Pages.

Verma, et al., "An Experimental Comparison of Partitioning Strategies in Distributed Graph Processing", In Proceedings of the VLDB Endowment vol. 10, Issue 5, Jan. 2017, pp. 493-504.

West, et al., "Introduction to graph theory", Published by Pearson Education, 2001, 610 Pages.

Widom, Jennifer, "Trio: A System for Integrated Management of Data, Accuracy, and Lineage", In Proceedings of the Conference on Innovative Data Systems Research, Jan. 4, 2005, pp. 1-22.

Wu, et al., "Scorpion: Explaining Away Outliers in Aggregate Queries", In Proceedings of the VLDB Endowment, vol. 6, Issue 8, Jun. 1, 2013, pp. 553-564.

Xie, et al., "LabelRankT: Incremental Community Detection in Dynamic Net- works via Label Propagation", In Proceedings of the Workshop on Dynamic Networks Management and Mining, Jun. 22, 2013, pp. 25-32.

Xirogiannopoulos, et al., "Extracting and Analyzing Hidden Graphs from Relational Databases", In Proceedings of the 2017 ACM International Conference on Management of Data, May 14, 2017, pp. 897-912.

Yan, et al., "Big Graph Analytics Platforms", In Journal Foundations and Trends in Databases archive, vol. 7, Issue 1-2, Jan. 12, 2017, 199 Pages.

"International Search Report & Written Opinion issued in PCT Application No. PCT/US20/015767", dated: May 4, 2020, 14 Pages.

Papailiou, et al., "Graph-Aware, Workload-Adaptive SPARQL Query Caching", In Proceedings of the ACM SIGMOD International Conference on Management of Data, May 31, 2015, pp. 1777-1792.

"AgensGraph Hybrid Graph Database", Retrieved from: https://bitnine.net/, Retrieved Date: Mar. 12, 2019, 06 Pages.

"Apache TinkerPop", Retrieved from: https://web.archive.org/web/20190306002416/https://tinkerpop.apache.org/, Retrieved Date: Mar. 6, 2019, 04 Pages.

"Cypher Graph Query Language", Retrieved from: https://www.opencypher.org/, Retrieved Date: Mar. 12, 2019, 02 Pages.

"DataStax DSE Graph Engine", Retrieved from: https://www.datastax.com/, Retrieved Date: Mar. 12, 2019, 05 Pages.

"DBpedia", Retrieved from: https://wiki.dbpedia.org, Retrieved Date: Mar. 12, 2019, 03 Pages.

"Graph processing with SQL Server", Retrieved from: https://docs.microsoft.com/en-us/sql/relational-databases/graphs/sql-graph-overview?view=sql-server-2017, Jul. 18, 2017, 04 Pages.

"GraphDBLP", Retrieved from: https://github.com/fabiomercorio/GraphDBLP, Mar. 6, 2018, 05 Pages.

"Gremlin Graph Traversal Language", Retrieved from: https://github.com/tinkerpop/gremlin/wiki, Jul. 12, 2016, 04 Pages.

"Neo4J Graph Database", Retrieved from: https://neo4j.com/, Retrieved Date: Mar. 13, 2019, 06 Pages.

"Network Repository", Retrieved from: http://networkrepository.com/, Retrieved Date: Mar. 12, 2019, 05 Pages.

"NetworkX Python Package for Network Data Analysis", Retrieved from: https://networkx.github.io/, Retrieved Date: Mar. 12, 2019, 01 Page.

"Oracle Parallel Graph Analytics", Retrieved from: https://www.oracle.com/technetwork/oracle-labs/parallel-graph-analytix/overview/index.html, Retrieved Date: Mar. 12, 2019, 02 Pages.

(56) References Cited

OTHER PUBLICATIONS

"Property Graphs", Retrieved from: https://www.w3.org/2013/socialweb/papers/Property_Graphs.pdf, 2013, 06 Pages.

"SWI-Prolog Engine", Retrieved from: http://www.swi-prolog.org/, Retrieved Date: Mar. 12, 2019, 01 Page.

"The EU General Data Protection Regulation", Retrieved from: https://eugdpr.org/, Retrieved Date: Mar. 12, 2019, 02 Pages.

"Titan Distributed Graph Database", Retrieved from: http://thinkaurelius.github.io/titan, Retrieved Date: Mar. 12, 2019, 02 Pages.

Zhuge, et al., "Graph structured views and their incremental maintenance", In Proceedings 14th International Conference on Data Engineering, Feb. 23, 1998, 10 Pages.

Aberger, "EmptyHeaded: A Relational Engine for Graph Processing", In Journal of ACM Transactions on Database Systems vol. 42, Issue 4, Nov. 2017, 44 Pages.

Ahn, et al., "Graph Sketches: Sparsi?cation, Spanners, and Subgraphs", In Proceedings of the 31st ACM SIGMOD-SIGACT-SIGAI symposium on Principles of Database Systems, May 21, 2012, pp. 5-14.

Antoniou, et al., "A semantic web primer", In MIT Press, 2004, 244 Pages.

Zhou, et al., "SCOPE: parallel databases meet MapReduce", In the International Journal on Very Large Data Bases, vol. 21, Issue 5, Oct. 2012, pp. 611-636.

Bhattacharyya, et al., "Transitive-closure Spanners", In Proceedings of the Twentieth Annual ACM-SIAM Symposium on Discrete Algorithms., Jan. 4, 2009, pp. 932-941.

Boldi, et al., "The WebGraph Framework I: Compression Techniques", In Proceedings of the 13th International Conference on World Wide Web, May 17, 2004, pp. 595-602.

Boutin, et al., "Apollo: Scalable and Coordinated Scheduling for Cloud-Scale Computing", In Proceedings of the 11th USENIX conference on Operating Systems Design and Implementation, Oct. 6, 2014, pp. 285-300.

Brin, et al., "The Anatomy of a Large-scale Hypertextual Web Search Engine", In Journal of Computer Networks and ISDN Systems vol. 30, Issues 1-7, Apr. 1998, pp. 107-117.

Chen, et al., "Graph OLAP: Towards online analytical processing on graphs", In Proceedings of Eighth IEEE International Conference on Data Mining, Dec. 15, 2008, pp. 103-112.

Chen, et al., "Mining Graph Patterns Efficiently via Randomized Summaries", In Proceedings of the VLDB Endowment vol. 2, Issue 1, Aug. 1, 2009, pp. 742-753.

Chen, "Powerlyra: Differentiated graph computation and partitioning on skewed graphs", In Proceedings of the Tenth European Conference on Computer Systems, Article No. 1, Apr. 21, 2015, 15 Pages.

Cheney, et al., "Provenance in Databases: Why, How, and Where", In Foundations and Trends in Databases vol. 1, No. 4, Jun. 2, 2009, pp. 379-474.

Ching, et al., "One Trillion Edges: Graph Processing at Facebook-Scale", In Proceedings of the 41st International Conference on Very Large Data Bases, Aug. 2015, pp. 1804-1815.

Curino, et al., "Graceful Database Schema Evolution: the PRISM Workbench", In Proceedings of the VLDB Endowment, vol. 1, Issue 1, Aug. 24, 2008, 12 Pages.

Dave, et al., "GraphFrames: an integrated API for mixing graph and relational queries", In Proceedings of the Fourth International Workshop on Graph Data Management Experiences and Systems, Jun. 24, 2016, 08 Pages.

Davidson, et al., "Provenance and scientifi?c workflows: challenges and opportunities", In Proceedings of the ACM SIGMOD International conference on Management of data, Jun. 9, 2008, pp. 1345-1350.

Deshpande, et al., "Adaptive Query Processing", Foundations and Trends in Databases, vol. 1, No. 1, Aug. 8, 2007, pp. 1-140.

Deutsch, et al., "Query reformulation with constraints", In ACM SIGMOD Record, vol. 35, Issue 1, Mar. 2006, pp. 65-73.

Fan, et al., "Incremental graph computations: Doable and undoable", In Proceedings of the ACM International Conference on Management of Data, May 14, 2017, pp. 155-169.

Fan, et al., "Query Preserving Graph Compression", In Proceedings of the 2012 ACM SIGMOD International Conference on Management of Data, May 20, 2012, pp. 157-168.

Francis, et al., "Cypher: An Evolving Query Language for Property Graphs", In Proceedings of the 2018 International Conference on Management of Data, Jun. 10, 2018, pp. 1433-1445.

Geisberger, et al., "Contraction Hierarchies: Faster and Simpler Hierarchical Routing in Road Networks", In Proceedings of the 7th International Conference on Experimental Algorithms, May 30, 2008, pp. 319-333.

Goasdoue, et al., "View selection in semantic web databases", In Proceedings of the VLDB Endowment, vol. 5, Issue 2, Oct. 2011, pp. 97-108.

Gonzalez, et al., "Graphx: Graph Processing in a Distributed Dataflow Framework", In Proceedings of the 11th USENIX conference on Operating Systems Design and Implementation, Oct. 6, 2014, 15 Pages.

Gupta, et al., "Materialized views: techniques, implementations, and applications", In MIT Press, Nov. 1999, 17 Pages.

Halevy, et al., "Goods: Organizing Google's Datasets", In Proceedings of the 2016 International Conference on Management of Data, Jun. 26, 2016, pp. 795-806.

Hung, et al., "RDF aggregate queries and views", In Proceedings of 21st International Conference on Data Engineering, Apr. 5, 2005, pp. 717-728.

Jindal, et al., "Computation Reuse in Analytics Job Service at Microsoft", In Proceedings of International Conference on Management of Data, Jun. 10, 2018, 13 Pages.

Jyothi, et al., "Morpheus: Towards automated slos for enterprise clusters", In Proceedings of the 12th USENIX conference on Operating Systems Design and Implementation, Nov. 2, 2016, pp. 117-134.

Kyrola, et al., "GraphChi: Large-Scale Graph Computation on Just a PC", In Proceedings of the 10th USENIX Conference on Operating Systems Design and Implementation, Oct. 8, 2012, pp. 31-46.

Leskovec, Jure, "SNAP LiveJournal dataset", Retrieved from: https://snap.stanford.edu/data/soc-LiveJournal1.html, Retrieved Date: Mar. 12, 2019, 01 Page.

Lin, et al., "Fast In-memory SQL Analytics on Typed Graphs", In Proceedings of the VLDB Endowment vol. 10, Issue 3, Nov. 1, 2016, pp. 265-276.

Liu, et al., "Graph Summarization Methods and Applications: A Survey", In Journal of ACM Computing Surveys vol. 51, Issue 3, Jun. 22, 2018, 34 Pages.

\* cited by examiner

MATERIALIZED GRAPH VIEWS FOR EFFICIENT GRAPH ANALYSIS

BACKGROUND

The modern digital world is experiencing exponential growth in the data volume associated with all facets of business and personal life. Solutions for efficient storage and recall of such information is in great demand. Businesses in particular have a need to transform collected and stored data into actionable intelligence. Relational database systems, and applications written to leverage such systems, are the traditional tool for describing, storing, and retrieving business information. More recently, however, there has been an increased demand for graph database systems.

Instead of the traditional columns and rows of a relational database Table, graph databases store data in form of nodes and edges. A node represents a distinct data value or set of related values, and edges connect the nodes and thereby represent relationships therebetween. Edges may likewise have one or more related values (e.g., a duration of the relationship. For example, data related to company employees may be represented by a node for each employee, and edges may connect employees that work with one another thereby representing the relationships of co-workers. In another example, an edge connecting a buyer and product may represent a product purchase, and may have attributes such as sale price, quantity, date, etc. A complete picture of all the nodes with all interconnecting edges is referred to as a graph.

Storing information in the form of a graph (as opposed to a native relational database Table) and performing graph queries can be desirable under certain circumstances. For example, graph storage can be desirable where a business application or its underlying data involve complex many-to-many relationships, or anytime there is a need to analyze the relationships that underlie the data (i.e., where the relationships between data points matter as much or more than the data points themselves). In these situations, graph storage and query capabilities can be useful since a graph database system typically allows one to more easily express certain types of queries. For example, pattern matching, multi-hop navigation, transitive closure and polymorphic queries are typically easier to express with a graph query. Accordingly, graphs are an increasingly popular way to model real-world entities (e.g., social networks, data lineage graphs and biological datasets) and the relationships between them.

Such real-world entities may require very large graphs, and queries over such graphs often involve expensive subgraph traversals and complex analytical computations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for generating and utilizing materialized graph views. A system according to one embodiment includes a workload analyzer, a view enumerator and an execution engine. The workload analyzer is configured to extract structural properties of the graph, receive and analyze a plurality of queries in a query workload. The view enumerator is configured to receive one or more graph view templates, determine query facts for each query of the workload, and enumerate sets of candidate views for each of the queries based on the corresponding query facts, the graph view templates, and the graph structural properties. The workload analyzer is configured to select at least one of the candidate views to materialize, and provide the selected at least one view to the execution engine that is configured to generate and store the materialized view. The workload analyzer may select a candidate view based on factors such as query evaluation cost estimates, candidate view performance improvement estimates, view size estimates and view creation cost estimates. A system according to another embodiment further includes a query rewriter configured to rewrite an input query to utilize a previously generated and stored materialized view in order to speed up the execution of the query.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
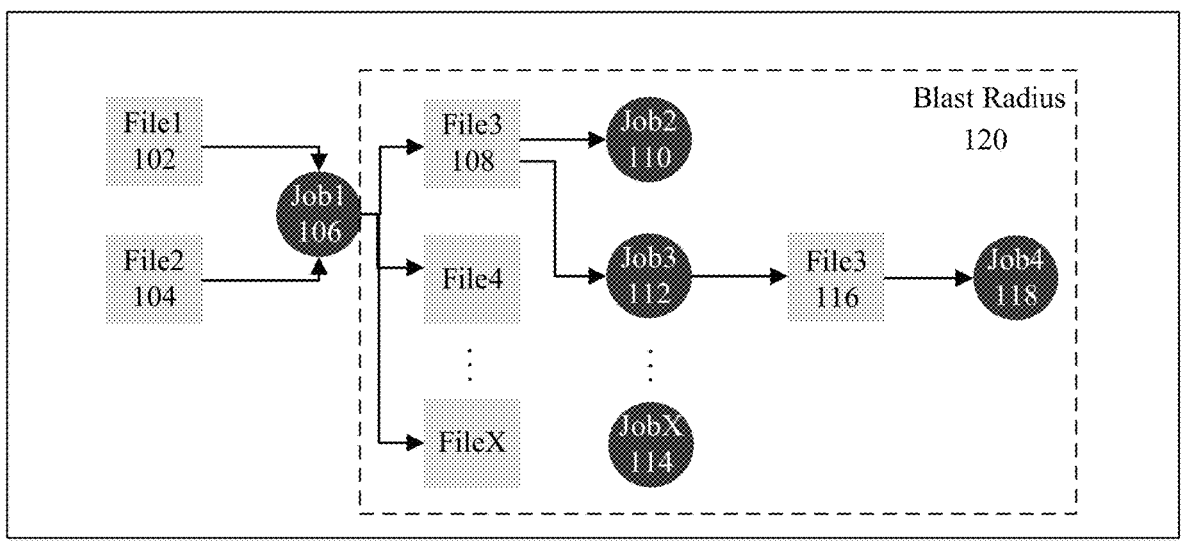
FIG. 1 depicts an example graph including visualization of a job impact query, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes and are not limiting. The examples described herein may be adapted to any type of targeted crawling system. Further structural and operational embodiments, including modifications/alterations, will become apparent to persons skilled in the relevant art(s) from the teachings herein.

Many real-world applications can be naturally modeled as graphs, including social networks, workflow, and dependency graphs as the ones in job scheduling and task execution systems, knowledge graphs, biological datasets, and road networks. An increasingly relevant type of workload over these graphs involves analytics computations that mix traversals and computation, such as finding subgraphs with certain connectivity properties or computing various metrics over sub-graphs. This has resulted many systems being designed to handle complex queries over such graphs.

In these scenarios, graph analytics queries require response times on the order of a few seconds to minutes, because they are either exploratory ad-hoc queries run by users (e.g., recommendation or similarity search queries), or because they power systems making online operational decisions (e.g., data valuation queries to control replication or job similarity queries to drive caching decisions in analytics clusters). However, many of these queries involve the enumeration of large subgraphs of the input graph, which can easily take minutes to hours to compute over large graphs on modern graph systems. To achieve target response times of a few seconds to minutes over large graphs, new techniques are needed.

In many of the abovementioned applications, the data has an inherent structure: their vertices and edges have specific types, following well-defined schemas and connectivity properties. For instance, social network data might include users, pages, and events, which can be connected only in specific ways (e.g., a page cannot "like" a user), or workload management systems might involve files and jobs, with all files being created or consumed by some job. However, most existing graph query engines do not take advantage of this structure to improve query evaluation time.

At the same time, it may be appreciated that similar queries are sometimes run very frequently over the same graph. Such queries can be identified and materialized as views to avoid significant computation cost during their evaluation. The aforementioned structural regularity of these graphs may be exploited to efficiently and automatically derive these materialized views. Like their relational counterparts, materialized graph views allow queries to be answered by operating on much smaller amounts of data and hiding/amortizing computational cost, while simultaneously offering substantial query performance improvements.

Such materialized graph views may advantageously be employed, for example, for managing large data lakes that in some instances may comprise several exabytes of data processed by hundreds of thousands of jobs, spawning billions of tasks daily. Operating such a large infrastructure requires, among other things, handling data governance and legal compliance (e.g., the EU General Data Protection Regulation ["GDPR"]). Efficiently handling of that much data and that many tasks may also require optimization based on query workloads, and such a large data lake must also typically support metadata management and enterprise search. A natural way to represent the data and to track datasets and computations at various levels of granularity is to build a provenance graph that captures data dependencies among jobs, tasks, files, file blocks, and users in the lake, where only specific relationships among vertices are allowed, e.g., a user can submit a job or read a file, a job can read or write files.

To enable the abovementioned applications over a provenance graph, support for a wide range of structural queries is required. For example, finding files that contain data from a particular user or that were created by a particular job is an anchored graph traversal that computes the reachability graph from a set of source vertices. On the other hand, detecting overlapping query sub-plans across jobs while avoiding unnecessary computations can be achieved by searching for jobs with the same set of input data. Other queries can include label propagation (i.e., marking privileged derivative data products), data valuation (i.e., quantifying the value of a dataset in terms of its "centrality" to jobs or users accessing them), copy detection (i.e., finding files that are stored multiple times by following copy jobs that have the same input dataset), and data recommendation (i.e., finding files accessed by other users who have accessed the same set of files that a user has).

The optimization opportunities in these types of queries may be understood by means of a running example: the job blast radius. Consider the following pseudo-query operating on a provenance graph: "For every job j quantify the cost of failing it, in terms of the sum of the CPU-hours of (affected) downstream consumers, i.e., jobs that directly or indirectly depend on j's execution." FIG. 1 depicts an example graph 100 including visualization of a job impact query such as that described above, according to an embodiment. For example, suppose the abovementioned query is executed where job j=Job1 106. The 'blast 'radius' 120 of Job1 106 (as denoted by the dotted line box) includes all the downstream jobs and files that depend directly or indirectly on Job1 106, where "depend directly or indirectly on" means the downstream jobs and files rely on the results and/or values of the upstream jobs and files, and executing the query requires traversal of the graph, following read/write relationships among jobs and files, and computing an aggregate along the traversals. As illustrated in FIG. 1, the jobs in 'blast radius' 120 that directly depend on Job1 106 include Job2 110 and Job3 112, and further including all other jobs up to and including JobX 114. Jobs that indirectly depend on Job1 106 include Job4 118. Answering a hypothetical query such as this is important for cluster operators and analysts for quantifying the impact of job failures, as such failures may affect scheduling and operational decisions.

The above described blast radius pseudo-query may be expressed in a suitable query language and executed on real-world graph database platforms in various ways. For example, consider Query-1 below:

```
SELECT A.pipelineName, AVG(T_CPU)
FROM (
    SELECT A, SUM(B.CPU) AS T_CPU
    FROM (
        MATCH (j1:Job)-[:WRITES_TO]->(f1Tile)
              (f1 :File)-[r*]->(f2:File)
              (f2:File)-[:IS_READ_BY]->(j2:Job)
        RETURN j1 as A, j2 as B
    )
    GROUP BY A, B
)
GROUP BY A.pipelineName
```

Query-1 is an example graph query that ranks jobs according to average CPU consumption, according to an embodiment. In particular, Query-1 illustrates a query that combines online analytical processing ("OLAP") and anchored path constructs to rank jobs in a blast radius based on average CPU consumption. Query-1 is expressed in the Cypher query language as provided in, for example, the Neo4j graph database or other graph databases that include openCypher implementations. It should be understood, however, that Query-1, and its query language, is merely exemplary, and an analogous query may be expressed in other ways, and on other graph database platforms.

Using the job blast radius query discussed above as an example, graph view materialization according to embodiments will now be discussed. In particular, embodiments may take advantage of some of the optimization opportunities discussed above to analyze the query patterns and the graph structure to optimize the example job blast radius query in the following ways. First, one may observe that graph 100 of FIG. 1 has structural connectivity constraints. In particular, jobs generate and consume files, but there are no file-file or job-job edges. Second, not all vertices and edges in graph 100 are relevant to answering the query. That is, vertices representing tasks, for example, are not used or necessary. Thus, a view of the graph that includes only vertices and edges of the types required by the query can prune a large number of nodes and edges from the graph. by storing as a view only vertices and edges of types that are required by the query, we can prune large amounts of data. A view of this type, that operates over groups of edges and/or vertices are referred to hereinafter as a summarizer. Third, although the blast radius query traverses job-file-job dependencies, it only requires metadata from jobs. Thus, it is possible to construct a view that stores only job nodes and their relationships (e.g., within 2 hops) to other jobs, and thus further reduces the data to be processed and the number of path traversals needing to be performed. This type of views is referred to hereinafter as a connector. In embodiments, such views of a graph may themselves be used directly to answer certain types of queries (or sub-portions of a larger query). In other embodiments, such view may also be materialized and cached such that queries that rely on such views in whole or in part may be computed much more quickly than would be possible operating over the entire graph.

Creating summarizer and connector views of a graph may be accomplished in various ways. In embodiments, a connector view of a graph G is a graph G' such that every edge e'=(u,v) ε E(G') is obtained via contraction of a single directed path between two target vertices u,v ε V(G). The vertex set V(G) of the connector view is the union of all target vertices with V(G)⊆V(G). Based on this generic definition for connector views, embodiments may support a number of specialized connector views, each of which differs in the target vertices that it considers. For example, embodiments may implement one of more of the following connector types of Table 1:

TABLE 1

| Connector Type | Description |
| --- | --- |
| Same-vertex-type connector | Target vertices are all pairs of vertices with a specific vertex type. |
| k-hop connector | Target vertices are all vertex pairs that are connected through k-length paths. |
| Same-edge-type connector | Target vertices are all pairs of vertices that are connected with a path consisting of edges with a specific edge type. |
| Source-to-sink connector | Target vertices are (source, sink) pairs, where sources are the vertices with no incoming edges and sinks are vertices with no outgoing edges. |

Figure 2:
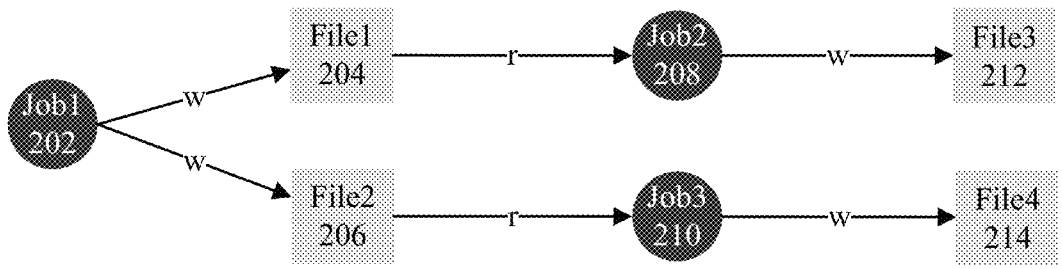
FIG. 2 depicts an input graph to be rendered as a 2-hop connector view, according to an embodiment.

Connector views may be better understood by considering an example. FIGS. 2-5 depict an example construction of 2-hop connector graphs views, according to an embodiment. More specifically FIGS. 2-5 depict the construction of 2-hop same-vertex-type connector views over a data lineage graph similar to that of graph 100 of FIG. 1. In particular, FIG. 2 depicts an input graph 200 to be rendered as a 2-hop connector view, according to an embodiment. Input graph 200 includes two types of vertices: jobs and files. Job vertices are represented by circles and labeled 'JobN' where N is a job id number. Likewise, file vertices are represented by squares and labeled 'FileN' where N is a file id number. Input graph 200 also includes two types of edges labeled 'w' and 'r' which signify a job writing to a file, and a job reading from a file, respectively.

Figure 3:
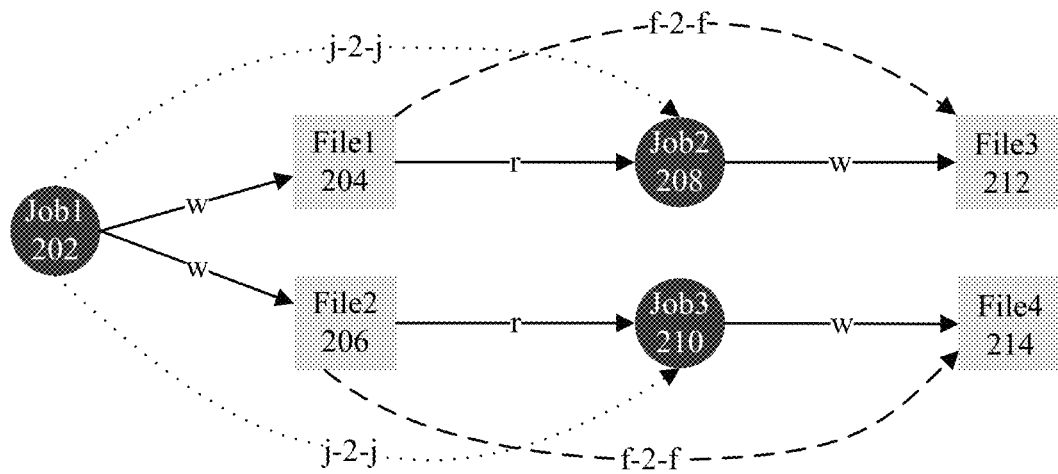
FIG. 3 depicts an augmented graph comprising the input graph of FIG. 2 augmented to include two different types of 2-hop connector edges, according to an embodiment.

FIG. 3 depicts an augmented graph 300 comprising the input graph 200 of FIG. 2 augmented to include two different types of 2-hop connector edges, according to an embodiment. The first type of 2-hop connector edge contracts 2-hop paths between pairs of job vertices (labeled j-2-j), whereas the second type contracts 2-hop paths between pairs of file vertices (labeled f-2-f).

Figure 4:
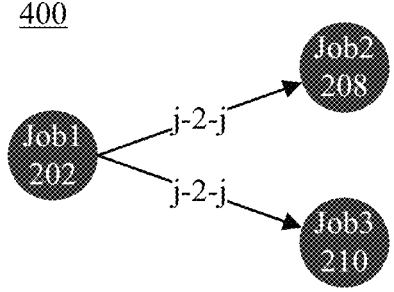
FIG. 4 depicts the input graph of FIG. 2 rendered as a job-to-job 2-hop connector view, according to an embodiment.
Figure 5:
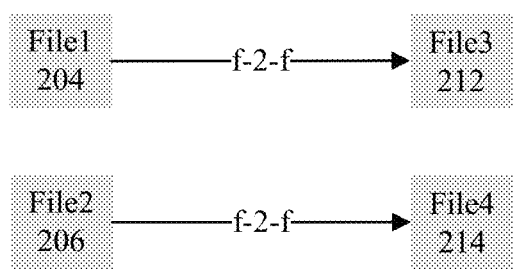
FIG. 5 depicts the input graph of FIG. 2 rendered as a file-to-file 2-hop connector view, according to an embodiment.

Finally, FIGS. 4 and 5 depict the two final connector graph views. In particular, FIG. 4 depicts input graph 200 of FIG. 2 rendered as a job-to-job 2-hop connector view 500, according to an embodiment. FIG. 5 depicts input graph 200 of FIG. 2 rendered as a file-to-file 2-hop connector view, according to an embodiment. It should be understood, that input graph 200 and the resulting connector views of FIGS. 4 and 5 are merely exemplary, and represent a relatively simple optimization that may be performed by embodiments. As such, FIGS. 2-5 are offered only for the purposes of better understanding operational aspects of embodiments, and should not be construed as limiting in any way. As described in more detail below, embodiments are enabled to create more complex views that, when created efficiently, offer substantial performance benefits in evaluating queries using those views instead of the base graph.

Turning now to further description of summarizer views, in embodiments, a summarizer view of a graph G is a graph G' such that V(G')⊆V(G), E(G')⊆E(G), and at least one of the following conditions is true: |V(G')|<|V(G)| or, |E(G')|<|E(G)|. In other words, a summarizer view is a graph view that is obtained via a sparsification operation that either reduces the number of edges, or the number of vertices in the original graph. Embodiments may implement sparsification operations that, for example, support filters that specify the type of vertices or edges that we want to preserve (inclusion filters) or remove (exclusion filters) from the original graph. Embodiments may also support aggregator summarizers that either group a set of vertices into a supervertex, a bag of edges into a superedge, or a subgraph into a supervertex.

Embodiments may implement some or all of the following summarizer types in Table 2 below:

TABLE 2

| Summarizer Type | Description |
| --- | --- |
| Vertex-removal | Removes vertices and connected edges that satisfy a given predicate, e.g., vertex type or vertex property. |
| Edge-removal | Removes edges that satisfy a given predicate, e.g., edge type or edge property. |
| Vertex-inclusion | Includes only edges that satisfy a given predicate, e.g., vertex type or vertex property. It only includes edges where both source and target vertices satisfy the predicate. |
| Edge-inclusion | Includes only edges that satisfy a given predicate, e.g., edge type, or edge property. |
| Vertex-aggregator | Groups vertices that satisfy a given predicate (e.g., vertex type or vertex property), and combines them using the provided aggregate function. |
| Edge-aggregator | Groups edges that satisfy a given predicate (e.g., edge type or edge property), and combines them using the provided aggregate function. If the resulting edges do not have the same source and destination vertices, it also performs a vertex aggregation operation. |
| Subgraph-aggregator | Groups both edges and vertices that satisfy a given predicate, (e.g., type or property) and combines them using the provided aggregate function. |

One of skill in the art will appreciate that summarizers closely resemble their relational counterparts (i.e., filters and aggregates). Accordingly, summarizer semantics are straightforward and a detailed example need not provided.

Having described a motivating example and set forth graph view definitions that form an operational basis for embodiments, description shall now turn to more specific implementation details. More specifically, we now describe more detail about how embodiments may start with the above-described graph view definitions and a graph, and determine which, if any, views of that graph may be desirable to materialize.

Before determining which views may be useful to materialize, embodiments must first determine, for a given set of view definitions and a given graph, which views are even possible. This process of determining possible views is referred to herein as view enumeration. Embodiments may perform view enumeration using an inference-based approach, whereby the view enumeration algorithm takes as input a query and a set of connector and summarizer view templates that are provided in a declarative fashion, and uses them to generate candidate views for the query.

In embodiments, view templates are expressed as inference rules (e.g., in Prolog), and embodiments employ an inference engine to generate candidate views from the query via rule evaluation. Embodiments also identify structural properties of the graph and of the query, and uses such properties to optimize the view enumeration process by pruning the search space, discarding infeasible candidates (e.g., in the blast radius/provenance graph example above, job-to-job edges).

The inference-based view enumeration approach provides not only an effective pruning of the search space for candidate views, but also provides the added benefit of not requiring implementation of complex transformations and search algorithms. Moreover, and as will be described in more detail below, view templates offer a flexible and easily modified mechanism for defining types of views to evaluate for materialization. Embodiments may use, for example, an inference engine such as Prolog which allows fast addition of new functionality with few additional lines of code. Existing techniques for view enumeration in the relational setting typically decompose a given query through a set of application-specific transformation rules, or through use of the query optimizer, and then implement complex search strategies to navigate through the candidate views. Although such approaches can be highly tuned for a given application or be tightly coupled with a query optimizer, these approaches require significant implementation effort and are inflexible when it comes to adding or modifying transformation rules.

Turning back to view enumeration embodiments, the required inputs to the view enumeration process (i.e., view templates, graph schema/properties) will now be discussed in turn below. In embodiments, view templates represent the mapping of the above described connector and summarizer view definitions to their natural expression as Prolog inference rules used to generate candidate views for a query. For example, consider Table 3 herein below which depicts example connector view template, according to an embodiment.

TABLE 3

Example Connector View Templates

Connector where all vertices are of the same type
connectorSameVertexType(X, Y, VTYPE) :-
    vertexType(X, VTYPE), vertexType(Y, VTYPE), path(X, Y)
T1-1

Connector where all edges are of the same type
connectorSameEdgeType(X, Y, ETYPE)
    pathOfEType(X, Y, ETYPE)
T1-2 k-hop connector
kHopConnector(X, Y, XTYPE, YTYPE, K) :-
    vertexType(X, XTYPE), vertexType(Y, YTYPE), kHopPath(X, Y, K)
T1-3 k-hop connector where vertices are of same type
kHopConnectorSameVertexType(X, Y, VTYPE, K):-
    kHopConnector(X, Y, VTYPE, VTYPE, K)
T1-4

Source-to-sink connector
sourceToSinkConnector(X, Y):-
    path(X, Y), source(X), sink(Y)
T1-5

Source-to-sink connector with restriction on vertex type
sourceToSinkConnector(X, Y, XTYPE, YTYPE):-
    vertexType(X, XTYPE), vertexType(Y, YTYPE),
sourceToSinkConnector(X, Y)
T1-6

One of skill in the art will recognize that view templates T1-1 through T1-62 comprise Prolog rules, some of which are built up from more primitive rules. Examples of relatively primitive rules may include: vertexType(X, VTYPE) that is satisfied when vertex X is of type VTYPE, or path(X,Y) that is satisfied when there is a path from X to Y, or pathOfEType(X, Y, ETYPE) that is satisfied when there is a path from X to Y consisting only of edges of type ETYPE. From these more primitive rules, view template definitions T1-1 through T1-6 of Table 3 may be defined, in embodiments. Of course, it will be appreciated that such view template definitions should not be construed as being restricted to definitions having a particular simplicity or complexity.

Returning to view template definitions of Table 3, view template T1-1, for example, defines a connectorSameVertexType view template built from vertexType( ) and path( ) as defined above, that may generate a same-vertex-type connector view when both vertices X and Y are the same type, and there is a valid path between them. Likewise, view template T1-3 defines a kHopConnector that may generate a k-hop connector view where there exists vertices X and Y with a kHopPath of exactly K hops therebetween. The scope and purpose of the remaining example connector view template definitions will be clear to those of skill in the art(s). Discussion now turns to summarizer view template definitions as shown in Table 4 below.

TABLE 4

Example Summarizer View Templates

Filter vertices and edges by type.
summarizerRemoveEdges(X, Y, ETYPE REMOVE, ETYPE KEPT) :-
    edge(X, Y), not(edgeType(X, Y, ETYPEREMOVE)),
    edgeType(X, Y, ETYPE KEPT).
summarizerRemoveVertices(X, VTYPE REMOVE, VTYPE KEPT) :-
    vertex(X), not(vertexType(X, VTYPE REMOVE)),
    vertexType(X, VTYPE KEPT).
        T2-1

Example aggregator function for higher-order functions such as aggregator graph view templates.
sum(X, Y, R) :- R is X + Y.
        T2-2

Ego-centric k-hop neighborhood (undirected).
kHopNbors(K, X, LIST) :- vertex(X),
    findall(SRC, kHopPath(SRC, X, K), INLIST),
    findall(DST, kHopPath(X, DST, K), OUTLIST),
    append(INLIST, OUTLIST, TMPLIST), sort(TMPLIST, LIST).
        T2-3

Example aggregator using k-hop neighborhood that aggregates all 1-hop neighbors as
    sum of their bytes, [e.g., kHopNborsAggregator(1, j2, 'bytes', sum, R)]
kHopNborsAggregator(K, X, P, AGGR, RESULT) :-
    kHopNbors(K, X, NBORS),
    convlist(property(P), NBORS, OUTLIST),
    foldl(AGGR, OUTLIST, 0, RESULT).
        T2-4

Table 4 depicts example summarizer view template definitions T2-1 through T2-4, according to an embodiment. As with the connector view templates described herein above, summarizer view template definitions of Table 4 are each composed of Prolog rule statements, and in some cases such rule statements are defined in terms of other rules. For example, summarizerRemoveEdges( ) as depicted in view template T2-1 is defined in terms of edge( ) and edgeType ( ) primitives. For example, in embodiments, summarizerRemoveEdges( ) may generate summarizer views where each of its constituent rules is satisfied. That is, summarizerRemoveEdges( ) generates a view including all nodes X and Y such that an edge connects X and Y, and such connecting edges are not of type ETYPE_REMOVE, or such connecting edges are of type ETYPE_KEEP. The scope and purpose of the remaining example summarizer view template definitions will be clear to those of skill in the art(s). Having described view template types, discussion now turns to a description of graph structural properties.

As mentioned above, embodiments may exploit graph structure features to prune the set of candidate views a view enumerator must consider. As understood by those of skill in the relevant art(s), a graph schema reflects structural rules that a compliant graph must adhere to. Accordingly, embodiments may be configured to extract first-order logic statements from such a graph schema. With reference to graph 100 depicted in FIG. 1 and Query-1 as discussed above, the schema corresponding to graph 100 will reflect, for example, that files do not write to files, but instead, only jobs write to files. In an embodiment, such extracted logic statements may then be combined with other inference rules such as those shown in Table 5 herein below to achieve the desired pruning of the input graph.

TABLE 5

Inference Rules for Structural Graph Properties

Diameter is a fact extracted by workload analyzer withinDiameter(K) :-
    diameter(D), K >= 0, K =< D

T3-1

Determine whether acyclic directed k-length paths are feasible over the input graph schema.

kHopAcyclicSchemaPath(X,Y,K) :-
    kHopAcyclicSchemaPath(X,Y, K, [ ]).
kHopAcyclicSchemaPath(X,Y,1,_) :-
    schemaEdge(X,Y,_).
kHopAcyclicSchemaPath(X,Y,K,Trail) :-
    schemaEdge(X,Z,_), not(member(Z,Trail)),
    kHopAcyclicSchemaPath(Z,Y,K1,[X|Trail]), K is K1 + 1.

T3-2

Determine whether cyclic directed k-length paths are feasible over the input graph schema checkKHopSchemaPath(X, Y, K) :-
    diameter(D), between(1, D, K1),
    kHopAcyclicSchemaPath(X, Y, K1), K1 > 1, M = mod(K, K1), 0 is M, K =< D.
checkKHopSchemaPath(X, Y, K) :-
    diameter(D), between(1, D, K1),
    kHopAcyclicSchemaPath(X, Y, K1), K1 == 1,
    kHopAcyclicSchemaPath(Y, Y, K2), M = mod(K-1, K2), 0 is M, 1 is M + K1, K =< D

T3-3

Used for pruning k-hop connector query rewritings isValidKHopSchemaPath(X, Y, K) :-
    once(checkKHopSchemaPath(X, Y, K))

T3-4

Table 5 depicts example inference rules T3-1 through T3-4 for generating graph structural properties based on graph schema, according to an embodiment. For example, consider kHopAcyclicSchemaPath( ) of inference rule T3-1 as shown above. The kHopAcyclicSchemaPath( ) rule infers all valid acyclic graph paths given the input schema. Likewise, isValidKHopSchemaPath( ) prunes the set of candidate views based on the inferred paths. These schema derived constraints, and as discussed in more detail below in the description of an embodiment of a view enumeration algorithm, enhance efficiency of embodiments since they capture structural properties that otherwise could not be inferred by simply looking at input queries or workload properties. For example, without these schema-based constraints, k-hop connectors for any value of k≥2 are possible candidates for Query-1. Yet, given these schema-based inference rules, the inference engine limits the search space to only values of k that are feasible given the graph's schema, i.e., even values of k. Thus, and as described in more detail below, the graph structural properties are important for limiting the search space for valid graph views.

a. Algorithm-1—an Inference-Based View Enumeration Algorithm

We turn now to a description of an example view enumeration algorithm, according to an embodiment. For example, consider the following pseudo-code listing of a view enumeration algorithm that may be implemented in embodiments:

```
Algorithm-1: an inference-based view enumeration algorithm
1:   function enumerate_views(query, view templates, graph schema)
2:       facts←[ ]
3:       query_ast←parse_query(query)
4:       query_graph←extract_graph pattern(query_ast)
5:       for edge ∈ get_edges(query_graph) do
6:           facts.append(emit_query_edge_facts(edge))
7:       for vertex ∈ get_vertices(query_graph) do
8:           facts.append(emit_query_vertex_facts(vertex))
9:       for edge ∈ get_schema_edges(graph_schema) do
10:          facts.append(emit_schema_edge_fact(edge))
11:      candidate_views←[ ]
12:      for template ∈ view_templates do
13:          inference_goal←template
14:          candidates←run_engine(inference_goal. facts)
15:          for {view, rewriting} ∈ candidates do
16:              candidate_views.append(view, rewriting)
17:      return candidate_views
```

As discussed above, embodiments of a view enumeration algorithm may receive a query, a set of view templates, and a graph schema as input, and generates a set of candidate views as output. With reference to Algorithm-1 shown above, after initializing facts as an empty list at line 2, and parsing the input query at line 3, Algorithm-1 proceeds to line 4 wherein graph patterns are extracted from the MATCH clause of the query's graph expressions, and used to determine graph query facts. In particular, for each vertex and for each edge in the graph pattern, Algorithm-1 emits a set of Prolog facts (lines 5-8), appending such sets to the facts list.

In our running example of the job blast radius query Query-1 introduced above, Algorithm-1 extracts the following graph query facts from the query:

```
file(f1).
file(f2).
job(j1).
job(j2).
vertex(f2).
vertex(f1).
vertex(j2).
vertex(j1).
edge(f2, j2).
isReadBy(f2, j2).
writesTo(j1, f1).
edge(j1, f1).
variableLengthPath(f1, f2, 0, INF).
```

The above set of facts contains all named vertices and edges in the query's graph pattern, together with any variable length regular path expressions (variableLengthPath). The view enumeration process also extracts structural properties (see discussion of Table 5 above) from the schema of the underlying data graph (lines 9-10). In the data lineage graph example used throughout this paper, there are only two types of vertices (files and jobs), and two types of edges representing the producer-consumer data lineage relationship between them. Hence, the set of facts extracted about this schema are simply:

schemaEdge('Job','File','writesTo').
schemaEdge('File','Job','isReadBy').

Although succinct, these facts could still generate an exponential number of candidate views. To address this possibility, embodiments may employ inference rules chosen to correctly bound this space. For example, the kHopAcyclicSchemaPath( ) rule discussed above in relation to Table 5 relies on schemaEdge( ) to generate all feasible k-hop acyclic paths between two types of vertices using a transitive closure construction. The inference engine employed in embodiments may use this and other rules as building blocks for more complex invariant checks, incorporating them as constraints to prune the set of feasible candidate views for a query.

Having gathered all query and schema facts, the algorithm performs the actual view candidate generation (lines 11-17). In particular, it calls the inference engine for every view template (line 14). As an example, assuming an upper bound on graph diameter of k=8, Algorithm-1 outputs the following instantiations of the kHopConnectorSameVertexType( ) graph view:

(VTYPE=Job, K=2), (VTYPE=Job, K=4),
(VTYPE=Job, K=6), (VTYPE=Job, K=8)

Similarly, candidates are generated for the remaining connector view templates of and summarizer view templates 500 of Table 3 and Table 5, respectively. For each candidate view generated, the inference engine also outputs a modified version of the input query, wherein the input query is rewritten to reference the corresponding candidate view. In embodiments, such a rewritten output query may be in Prolog format and require conversion back the Cypher format. For example, consider Query-1 in rewritten form as shown by Query-2 below, to incorporate a 2-hop connector view:

```
SELECT A.pipelineName, AVG(T_CPU)
FROM (
    SELECT A, SUM(B.CPU) AS T_CPU
    FROM (
        MATCH (j1:Job)-[:2_HOP*]->(j2:Job)
        RETURN j1 as A, j2 as B
    )
```

-continued

```
        GROUP BY A, B
)
        GROUP BY A.pipelineName
```

Query-2 shown above depicts an example rewriting of Query-1 shown above, wherein Query-2 incorporates a 2-hop connector graph view, according to an embodiment. A comparison of Query-1 and Query-2 reveals that the latter has a considerably simplified MATCH expression versus the former. In particular, compare each MATCH expression:

| MATCH of Query-1 | MATCH of Query-2 |
|---|---|
| MATCH<br>(j1: Job)-[:WRITES_TO]->(f1: File)<br>(f1:File)-[r*] ->(f2:File)<br>(f2:File)-[:IS_READ_BY] ->(j2:Job) | MATCH<br>(j1:Job)-[:2_HOP*]->(j2:Job) |

In this example, therefore, the bulk of the query workload may be replaced by the appropriate view. Particularly where such a view is materialized, execution of Query-2 will typically be much faster that Query-1. Note, in the example embodiments discussed herein above, although multiple view candidates may be considered for each query, a typical query rewriting such as illustrated by Query-2 may include a single view in the rewritten query. It should be understood that the discussions and examples discussed herein are merely illustrative of concepts, and in other embodiments, queries may be rewritten to take advantage of multiple views. Despite the query execution speedups inherent to materialized views, the overhead of generating such materialized views may exceed any such speedup, or the speedups enabled by various candidate views may be grossly different depending on the particular query or query workload. Having enumerated candidate views, embodiments must now turn to a determination of whether to materialize any of the enumerated candidate views, and if so, which ones.

b. View Selection

A determination of whether and how to materialize candidate views depends on evaluation of the corresponding costs, both in terms of time and space, for materializing such views. Given the importance of path traversals in graph queries, embodiments are configured to use a cost model to estimate the size of views involving such operations, and to compute the creation cost of such views. Embodiments may also be configured to factor other types of costs into the decision about whether to materialize a view. For example, embodiments may also consider view maintenance costs (i.e., the cost of keeping materialized views up to date as new data changes the underlying graph). As will be discussed in more detail below, cost estimates are important for determining which views are the most beneficial to materialize. With respect to path views, sizes of such views may be estimated reasonably well by embodiments that leverage graph schema constraints and associated degree distributions. Moreover, although some techniques for relational cost-based query optimization may at times target filters and aggregates, most efforts in this area have largely focused on join cardinality estimation. This is in part because joins tend to dominate query costs, but also because estimating join cardinalities is a harder problem than, e.g., estimating cardinality of filters. Furthermore, due to summarizer connectors being largely analogous to filters and aggregates in relational query optimization, techniques may exist in the relational world that may be leveraged for cardinality estimation of filters and aggregates in the summarizer context. Accordingly, embodiments disclosed herein focus on cost model contributions as they relate to connector views, and description of such embodiments focuses on how to estimate the size of graph connector views which may in turn underpin the cost model.

Embodiments may rely at least in part on two sets of statistics for use in estimating view size. During initial loading of the graph, for example, embodiments may determine the following graph properties: (i) vertex cardinality for each vertex type of the raw graph; and (ii) coarse-grained out-degree distribution summary statistics, i.e., the 50th, 90th, and 95th out-degree for each vertex type of the raw graph. Embodiments may elect not use one or either of the abovementioned statistics, and instead employ one or more heuristics enabled by other statistics.

i. View Size Estimation

Estimating the size of a view is essential when performing view selection. In particular, it is required when computing various cost components and determining whether a set of views will fit in a given space budget. In one embodiment, an estimate of the size of a view may comprise the number of edges that the view has, since the number of edges usually dominates the number of vertices in real-world graphs. In other embodiments, however, more sophisticated estimates may be used. For example, observe that the estimated number of edges in a directed path p with k hops is given by the following formula:

$$\hat{E}(p, k) = \frac{1}{k} \cdot \sum_{i=1}^{k} \overline{deg_{out}}(t(n_i)) \cdot \text{card}(t(n_i)) \quad (1)$$

where $n_i$ is the i-th node in p, $t(n_i)$ is the type of that node, $deg_{out}(t)$ is the average out-degree of nodes of type t, and card(t) is the number of nodes of type t.

We can then estimate the size of a view as:

$$\text{Size}(v) = n \cdot \hat{E}(p, \text{length}(p)) \quad (2)$$

where p is the longest directed path (as obtained from the view's definition), length(p) is the number of hops in p, and n is the number of simple paths from any source node s to any sink node t in graph G.

ii. View Creation Cost

Of course, the size of a view candidate has real impacts in terms of storage of materialized versions of that view. But there are also computational and I/O costs associated with computing and materializing candidate views, and such costs may be accounted for in the overall cost model, in embodiments. However, it may be observed that since the primitives required for computing and materializing the graph views of interest are relatively simple, the I/O cost dominates computational costs. Accordingly, other embodiments may instead omit computational costs from the cost model. In such embodiments, therefore, the view creation cost may be modeled as being directly proportional to $\hat{E}(G, k, \alpha)$.

iii. Query Evaluation Costs

Embodiments may also incorporate query evaluation costs into a cost model. As will be discussed further herein below, query evaluation costs factor into both view selection of candidate views, as well as the query rewriting process. Embodiments may leverage pre-existing query cost models for graph database queries as a proxy for the cost to compute a given query using the raw graph. For example, embodiments may leverage cost-based optimizers included in existing graph database platforms (e.g., Neo4j) that are capable of establishing a reasonable ordering between all vertex scans without indexes, scans from indexes, and range scans. Other embodiments, however, may incorporate in whole or in part graph view size estimation techniques to further improve the query evaluation cost model. Moreover, other methods of estimating the evaluation costs of graph queries are known in the art.

iv. View Selection as a Knapsack Problem

Having determined the various costs for each candidate view as described above, and given a particular storage space budget for materialized views, embodiments may proceed with view selection in the following general manner. It should be appreciated that the goal of a reasonable view selection algorithm is to select the views that lead to the biggest performance gains relative to their cost, while respecting the space budget.

Accordingly, embodiments may formulate a view selection algorithm as a 0-1 knapsack problem. Generally speaking, the "knapsack problem" is the nickname for a combinatorial optimization problem that is commonly expressed as follows: given a set of items, each with a volume (or weight) and value, determine the number of each item to include in a collection (i.e., the 'knapsack') so that the total volume/weight is both less than or equal to the size limit (i.e., the volume or weight limit of the knapsack), and as large as possible.

Under this paradigm, embodiments may treat the volume of the knapsack as the space budget dedicated to view materialization. The items that we want to fit in the knapsack are the candidate views generated by the view enumerator. The weight/volume of each item is the view's estimated size as discussed above. Lastly, the value of each item is the performance improvement achieved by using that view divided by the view's creation cost.

Suppose the system bears a workload Q that comprises a set of queries. For each query q in Q, embodiments may define a performance improvement factor for a view v for that query as v's estimated evaluation cost divided by q's estimated evaluation cost (with techniques of calculating such estimates being discussed above). The quotient calculated above represents a performance improvement factor estimate under the assumption that the cost of evaluating the view v is the very same cost that may be avoided in evaluating the query q if the materialization of v is substituted at evaluation time of q. Thus, the performance improvement factor represents a percentage improvement that may be obtained. By way of example, and with numbers having no real-world meaning, suppose the evaluation cost of v is 2, whereas the evaluation cost of q is 5. The performance improvement factor is the quotient of these values, or $\frac{2}{5}$ (or 0.4, or 40%), representing a performance improvement in evaluating q of 40%. Looked at in a slightly different way, by avoiding the cost of v (i.e., 2) during evaluation of q, q may be evaluated for a cost of only 3 which indeed is 40% less than 5.

Naturally, the performance improvement of view v for the entire workload Q is simply the sum of view v's improvement for each query in Q. Queries for which view v cannot be used of course have zero performance improvement. In this general manner, embodiments may value each candidate view v according to its estimated contribution to improving the performance of the entire workload, while balancing such improved performance off against the size of the view for determining whether to materialize and cache the view for later use (e.g., per solutions to the knapsack problem).

c. Query Rewriting

Selecting and storing materialized views from amongst a set of candidate views is, however, only part of the overall query optimization strategy employed by embodiments. After caching a set of materialized views, embodiments as disclosed herein must also determine which, if any, of these views is best to employ for improving the performance of each subsequent query. The determination of whether and how to use a materialized view to augment an incoming query is generally referred to herein as query rewriting. In embodiments, given a query and a set of materialized views, view-based rewriting is the process of finding the rewriting of the query that leads to the highest reduction of its evaluation cost by using one or more of the materialized views. Embodiments may perform this process in the following general manner. When a query q arrives in the system, the system invokes the view enumerator for that query (and that query alone, the remainder of the query workload need not considered for query rewriting purposes), which enumerates a set of view candidates for q in the same general manner discussed above in conjunction with view materialization. Thereafter, embodiments may determine which of the view candidates have not been materialized (i.e., are not cached), and eliminate such view candidates from consideration (i.e., by discarding or pruning such views).

Among the remaining candidate views that are output by the enumerator, and accordingly for which a corresponding materialized view is available, embodiments will generally select the materialized view that had the highest evaluation cost (i.e., took the longest amount of time to evaluate, or otherwise used the most resources) for including in the rewritten query. Note, in one embodiment, the evaluation cost of the materialized view may be an estimated evaluation cost, estimated by a cost model as discussed above. In another embodiment, however, the actual creation cost of materializing the view may be measured during such creation, and saved for later use.

Selection of the view with the highest evaluation cost, by whatever metric, is a natural choice given that it is that very same cost that will be avoided when the rewritten query is executed (i.e., as compared to the original, non-rewritten query). In an embodiment, queries may be rewritten to include only a single materialized view, or may be rewritten to include and take advantage of multiple materialized views. As discussed above, Query-2 depicts an example rewriting of Query-1 rewritten to include a 2-hop connector graph view.

d. Example System Embodiment

Figure 6:
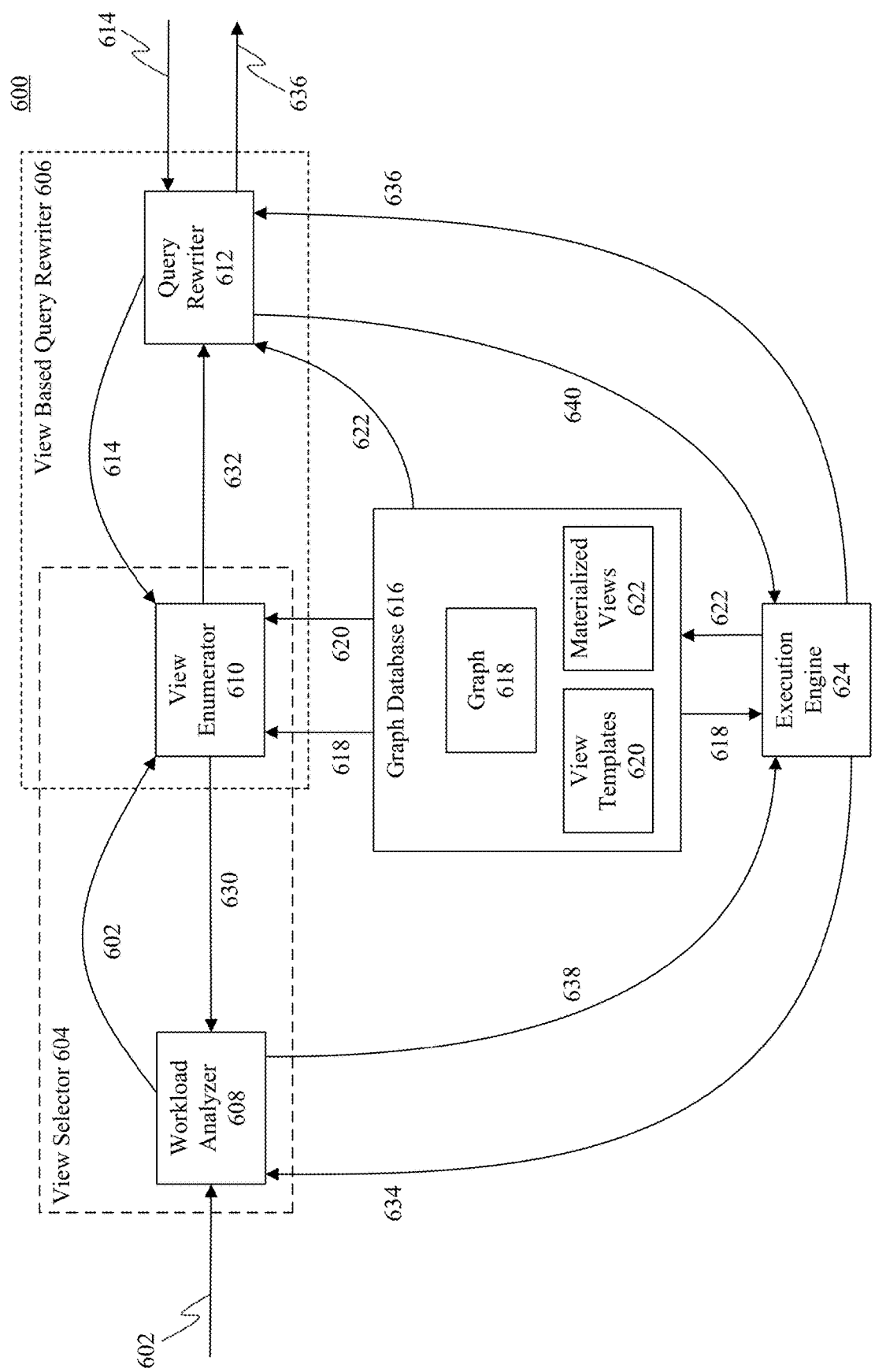
FIG. 6 depicts an example system for generating and utilizing materialized graph views, according to an embodiment.

Having discussed the general operational aspects of embodiments, discussion now turns to a description of more specific embodiments. For instance, FIG. 6 depicts an example system 600 for generating and utilizing materialized graph views, according to an embodiment. Other structural and operational embodiments will be apparent to person skilled in the relevant art(s) based on the following discussion regarding system 600 of FIG. 6.

FIG. 6 depicts a system 600 for an example system 600 for generating and utilizing materialized graph views, according to an embodiment. As shown in FIG. 6, system 600 includes a workload analyzer 608, a view enumerator 610, a query rewriter 612, an execution engine 624 and a graph database 616. In embodiments, workload analyzer 608 and view enumerator 610 may operate together as a view selector 604. Query rewriter 612 and view enumerator 610 may likewise operate together as a view-based query rewriter 606.

Although graph database 616 is depicted as a monolithic component, graph database 616 may be implemented as any number of computing devices, including servers, and may include any type and number of other resources, including resources that facilitate communications with and between computing devices connected via networks as described above. In embodiments, servers implementing graph database 616 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers that comprise graph database 616 may be co-located (e.g., housed in one or more nearby buildings with associated components such as backup power supplies, redundant data communications, environmental controls, etc.) to form a datacenter, or may be arranged in other manners. Accordingly, in an embodiment, graph database 616 may comprise a datacenter in a distributed collection of datacenters.

In embodiments, workload analyzer 608 of system 600 as shown in FIG. 6 is configured to receive query workload 602 which comprises a set of graph queries 626. Moreover, query rewriter 612 is likewise configured to receive an ad-hoc query 614, also comprising a graph query. Such queries may be provided local to system 600 (e.g., from a terminal), or remotely via a network such as, for example, the Internet. A network may, however, comprise one or more networks such as local area networks (LANs), wide area networks (WANs), enterprise networks, and may include one or more of wired and/or wireless portions. Examples of computing devices that may be used to provide query workload 602 or ad-hoc query 614 to system 600 include, for example and without limitation, desktop computers, laptop computers, tablet computers, netbooks, smartphones, wearable computing devices, etc.

Figure 7:
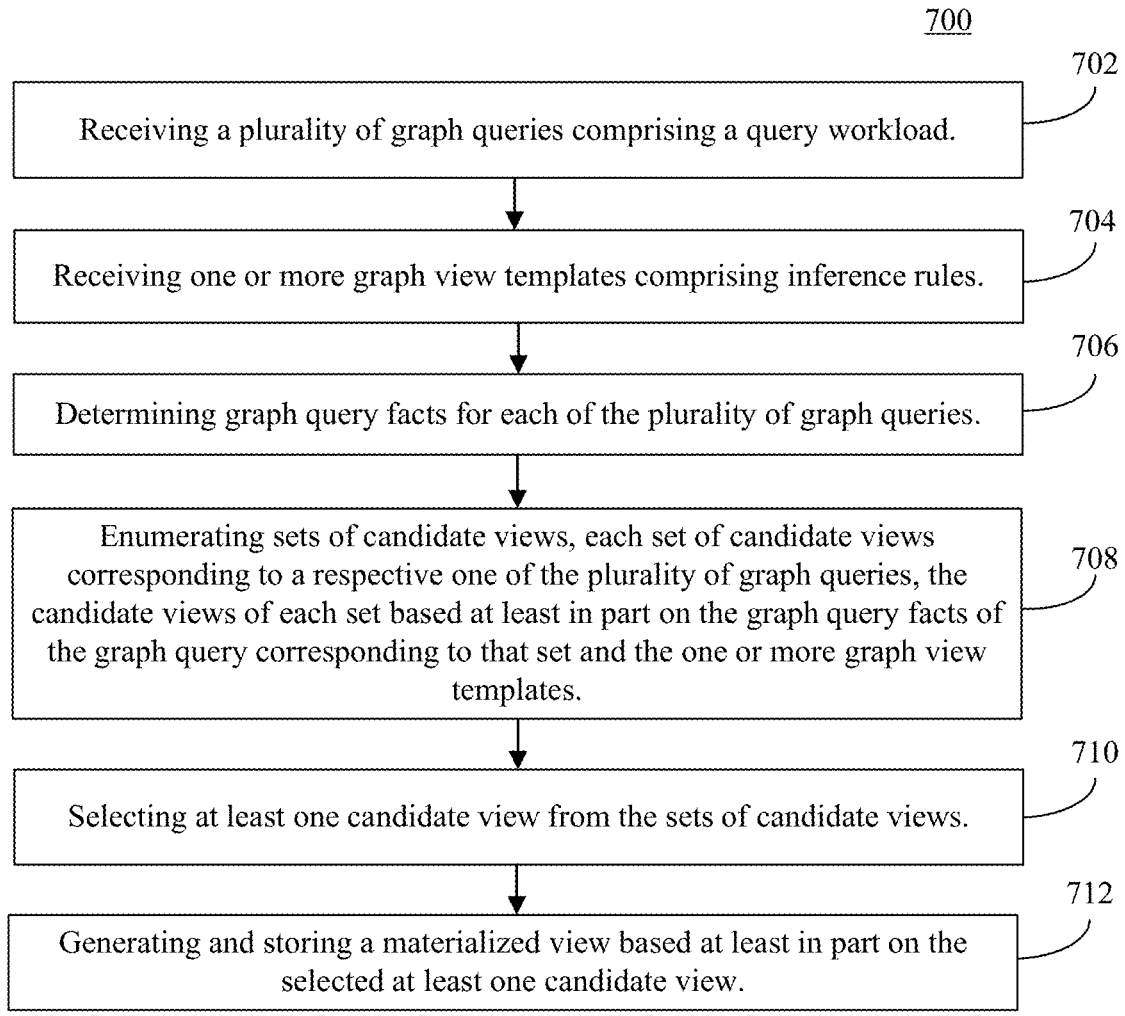
FIG. 7 depicts a flowchart of an example method for generating materialized graph views based on a query workload, according to an embodiment.

Further operational aspects of system 600 of FIG. 6 will now be discussed in conjunction with FIG. 7 which depicts a flowchart 700 of an example method for generating materialized graph views based on a query workload, according to an embodiment. Although described with reference to system 600 of FIG. 6, the method of FIG. 7 is not limited to that implementation. Other structural and operational embodiments will be apparent to persons skilled in the relevant art(s) based on the following discussion regarding system 600 of FIG. 6.

Flowchart 700 is an example method for generating materialized graph views of a graph, the graph being stored in a graph database according to a corresponding graph schema. Flowchart 700 begins at step 702. At step 702, a plurality of graph queries comprising a query workload are received. For example, and with reference to system 600 of FIG. 6, workload analyzer 608 may, as discussed above, receive query workload 602 from one or more locations, both local to and remote from system 600. Although the graph queries of query workload 602 are used by embodiments to determine graph views to materialize, as described herein, such queries may also be passed through for ordinary query evaluation. For example, workload queries may be provided by workload analyzer 608 to execution engine 624 for evaluation (not shown in FIG. 6). Alternatively, workload analyzer 608 may be provided query workload 602 in parallel with some other database system (also not shown) that may be responsible for answering such queries. Flowchart 700 of FIG. 7 continues at step 704.

Flowchart 700 of FIG. 7 continues with step 704. In step 704, one or more graph view templates comprising inference rules are received. For example, and with continued reference to system 600 of FIG. 6, view enumerator 610 may be configured to receive view templates 620, in an embodiment. In an embodiment, view templates 620 may be stored in, and provided by, graph database 616 as shown in FIG. 6. In other embodiments, however, view templates 620 may be received by view enumerator 610 from some other source. Moreover, in embodiments, view templates 620 may likewise be stored in view enumerator 610 to be re-used over time after having been received initially. View templates 620 may comprise, for example, connector and/or summarizer view templates such as those described above in conjunction with Table 3 AND Table 4, respectively. Note, view templates 620, as well as the connector view templates and summarizer view templates of Table 3 and Table 4, respectively, are mere examples, and other types of templates may be employed in other embodiments.

In step 706, graph query facts for each of the plurality of graph queries are determined. For example, and with continued reference to system 600 of FIG. 6, view enumerator 610 may be configured to operate according to Algorithm-1 (as discussed above at section II.a), in embodiments. More specifically, embodiments of view enumerator 610 may receive the graph queries of query workload 602, and extract graph patterns from the MATCH clause of each query's graph expressions.

Flowchart 700 of FIG. 7 continues with step 708. In step 708, sets of candidate views are enumerated, wherein each set of candidate views corresponds to a respective one of the plurality of graph queries, the candidate views of each set based at least in part on the graph query facts of the graph query corresponding to that set and the one or more graph view templates. For example, and with continued reference to system 600 of FIG. 6, view enumerator 610 may be configured to operate according to Algorithm-1 (as discussed above at section II.a), in embodiments. More specifically, and as discussed in greater detail above, after gathering the graph query facts, graph schema facts and the view template inference rules, view enumerator 610 may provide such facts and inference rules to an inference engine (e.g., Prolog) to generate candidate views 630. As discussed above, candidate views 630 comprise candidate views for every combination of view template from view templates 620, and each query of query load 602, and may be organized as sets, each set corresponding to a particular query of query load 602. Candidate views 630 are in turn provided to workload analyzer 608, in embodiments.

At step 710, at least one candidate view is selected from the sets of candidate views. For example, and with continued reference to system 600 of FIG. 6, workload analyzer 608 may be configured to operate according to Algorithm-1 (as discussed above at section II.a), in embodiments. More specifically, workload analyzer 608 may determine which of candidate views 630 offer the best tradeoffs between view size and performance improvement for query workload 602, in embodiments. For example, embodiments may implement a solution the knapsack problem (as described above at section II.b.iv), wherein each candidate view has a size, a value (performance improvement factor), and the optimal combination of candidate views is chosen to maximize total value while also maximizing utilization of storage provided for materialized views. Thus, in embodiments, workload analyzer 608 is configured to choose an optimal set of views to materialize and cache.

Flowchart 700 of FIG. 7 concludes at step 712. In step 712, a materialized view based at least in part on the selected at least one candidate view is created and stored. For example, and with continued reference to system 600 of FIG. 6, workload analyzer 608 and execution engine 624 may be configured to operate according to view selection techniques discussed above at section II.b, in embodiments. More specifically, workload analyzer 608, having determined which of the candidate views to materialize, may be configured to provide corresponding candidate view queries 638 to execution engine 624 for execution. Execution engine 624 will in turn process the view query or queries associated with each candidate view to generate a materialized view, and thereafter store such materialized views 622 in graph database 616.

In the foregoing discussion of steps 702-712 of flowchart 700, it should be understood that at times, such steps may be performed in a different order or even contemporaneously with other steps. For example, the extracting, receiving and determining of steps 704-706, respectively, may be performed in a different order or even simultaneously. Other operational embodiments will be apparent to persons skilled in the relevant art(s). Note also that the foregoing general description of the operation of system 600 is provided for illustration only, and embodiments of system 600 may comprise different hardware and/or software, and may operate in manners different than described above. Indeed, steps of flowchart 700 may be performed in various ways.

Figure 8:
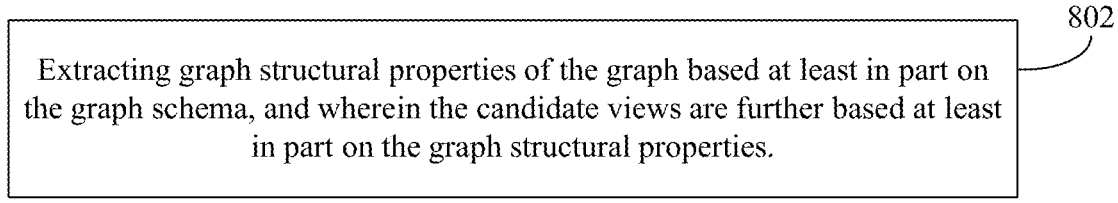
FIG. 8 depicts a flowchart of an additional example method of generating materialized views based at least in part on extracted graph structural properties, according to an embodiment.

For example, FIG. 8 depicts a flowchart of an additional example method of generating materialized views based at least in part on extracted graph structural properties, according to an embodiment, and wherein flowchart 800 comprises refinements or additions to the method steps of flowchart 700 as depicted in FIG. 7. Accordingly, flowchart 800 of FIG. 8 will also be described with reference to system 600 of FIG. 6. However, other structural and operational embodiments will be apparent to persons skilled in the relevant art(s) based on the following discussion regarding flowchart 800.

Flowchart 800 of FIG. 8 begins at step 802. At step 802, graph structural properties of the graph are extracted based at least in part on the graph schema, and wherein the candidate views are further based at least in part on the graph structural properties. For example, and with continued reference to system 600 of FIG. 6, view enumerator 610 may gain access to graph 618 (and its corresponding graph schema) in graph database 616. In embodiments, view enumerator 610 may be configured to use inference rules T3-1 through T3-4 as depicted in Table 5 to generate graph structural properties in the manner described above with respect to Table 5 and view enumeration Algorithm-1 as discussed above at section II.a. Note, the inference rules Table 5 are merely exemplary, and other inference rules may be used in other embodiments. View enumerator 610 may then operate according to step 708 of flowchart 700 of FIG. 7 discussed above, except that candidate views are generated based not only on graph query facts, graph schema facts and the view template inference rules, but also on the extracted graph structural properties. Candidate views 630 generated in the manner described herein in relation to step 802 of flowchart 800 may likewise be provided to workload analyzer 608, in embodiments, and as discussed above. It should be noted that flowchart 800 of FIG. 8 is but one example embodiment, and other methods exist for materializing graph views.

Figure 9:
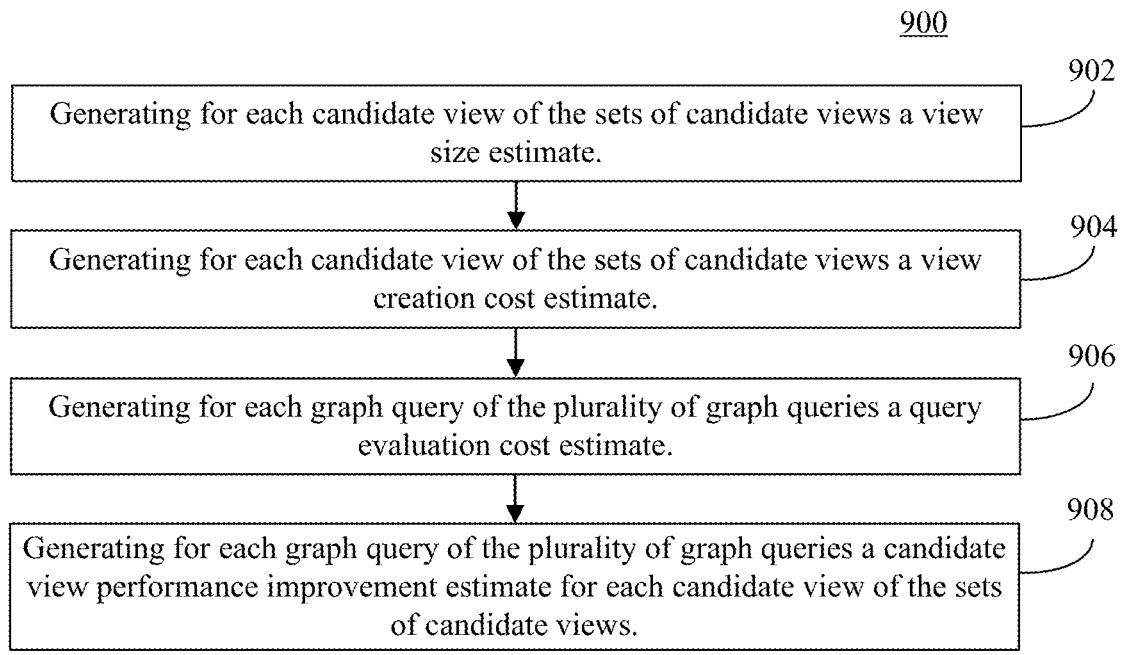
FIG. 9 depicts a flowchart of an example method for generating candidate view estimates and graph query performance estimates, according to an embodiment.

For example, FIG. 9 depicts a flowchart 900 of an example method for generating candidate view estimates and graph query performance estimates, according to an embodiment, and wherein flowchart 900 comprises refinements or additions to the method steps of flowcharts 700 and/or 800 as depicted in FIGS. 7 and 8, respectively. Accordingly, flowchart 900 of FIG. 9 will also be described with reference to system 600 of FIG. 6. However, other structural and operational embodiments will be apparent to persons skilled in the relevant art(s) based on the following discussion regarding flowchart 900.

As shown in FIG. 9, flowchart 900 begins at step 902. In step 902, a view size estimate is generated for each candidate view of the sets of candidate views. For example, and with continued reference to system 600 of FIG. 6, having received candidate views from view enumerator 610 of system 600, workload analyzer 608 may be configured to determine a view size estimate for each candidate view. In embodiments, workload analyzer 608 may be configured to determine the view size estimate according to one or more of the formulas in the discussion of view size estimation above at section II.b.i. However, other methods for estimating a view size may be employed in other embodiments.

At step 904, a view creation cost estimate is generated for each candidate view of the sets of candidate views. For example, and with continued reference to system 600 of FIG. 6, having received candidate views from view enumerator 610 of system 600, workload analyzer 608 may be configured to determine a creation cost estimate for each candidate view. In embodiments, workload analyzer 608 may be configured to determine the creation cost estimate according the discussion of view creation cost estimation above at section II.b.ii. In particular, embodiments may model view creation costs as being proportional to the view size estimate generated at step 902. However, other methods for estimating creation cost may be employed in other embodiments, particularly where the computational cost of view creation is nonnegligible.

As shown in FIG. 9, flowchart 900 continues at step 906. In step 906, for each graph query of the plurality of graph queries, a query evaluation cost estimate is generated. For example, and with continued reference to system 600 of FIG. 6, in embodiments, workload analyzer 608 may be configured to generate a query evaluation cost estimate for each query of query workload 602. In particular, workload analyzer 608 may be configured to generate a query evaluation cost estimate in accordance with the discussion of query evaluation costs above at section II.b.iv. Moreover, other methods for estimating the evaluation cost of a graph query are known in the art.

Flowchart 900 concludes at step 908. In step 908, for each graph query of the plurality of graph queries, a candidate view performance improvement estimate is generated for each candidate view of the sets of candidate views. For example, and with continued reference to system 600 of FIG. 6, for each query of query workload 602, workload analyzer 608 may determine a candidate view performance improvement estimate for each candidate view as enumerated, for example, at step 708 of flowchart 700 of FIG. 7 as described above. In an embodiment, workload analyzer 608 may determine the candidate view performance estimate for a particular view and particular query to be a quotient of the view creation cost estimate for the candidate view, and the query evaluation cost estimate for the particular graph query, (with such costs determined as previously described).

Figure 10:
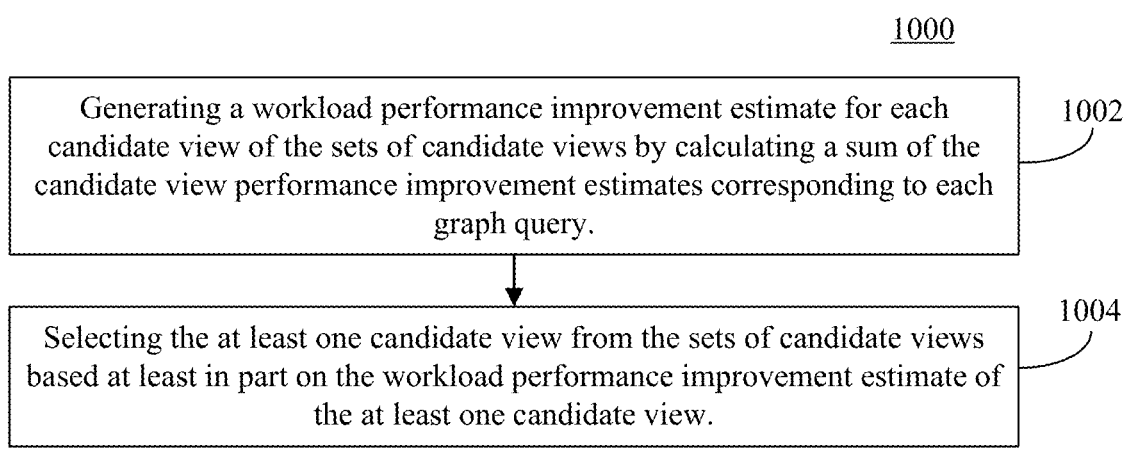
FIG. 10 depicts a flowchart providing an example method for selecting views for materialization based in part on a query workload performance improvement estimate, according to an embodiment.

FIG. 10 depicts a flowchart 1000 of FIG. 10 depicts an example method for selecting views for materialization based in part on a query workload performance improvement estimate, according to an embodiment. FIG. 10 is described with continued reference to system 600 of FIG. 6. However, other structural and operational embodiments will be apparent to persons skilled in the relevant art(s) based on the following discussion regarding flowchart 1000.

As shown in FIG. 10, flowchart 1000 begins at step 1002. In step 1002, a workload performance improvement estimate is generated for each candidate view of the sets of candidate views by calculating a sum of the candidate view performance improvement estimates corresponding to each graph query. For example, and with continued reference to system 600 of FIG. 6, embodiments of workload analyzer 608 may perform step 908 of flowchart 900 of FIG. 9, as discussed just above, to generate a performance improvement estimate for every combination of candidate view and query of query workload 602. Such as estimate reflects the performance improvement afforded to a single query by a single view. However, a more useful metric, may be the performance improvement afforded to the entirety of query workload 602 by that view. Accordingly, workload analyzer 608 may be configured to generate a workload performance improvement estimate for each candidate view, which represents exactly the abovementioned metric. In particular, the sum of the performance improvement estimates of a view for each query in query workload 602.

At step 1004, the at least one candidate view from the sets of candidate views is selected based at least in part on the workload performance improvement estimate of the at least one candidate view. For example, and with reference to system 600 of FIG. 6, and flowchart 700 of FIG. 7, workload analyzer 608 is configured to select at least one candidate view for materialization at step 710 of flowchart 700. Here, at step 1004, workload analyzer 608 is further configured base such selection at least in part on the workload performance improvement estimates determined at step 1002. As discussed above, such an estimate may represent the 'value' of a candidate view for the purposes of solving a knapsack problem with respect to view selection and materialization.

Figure 11:
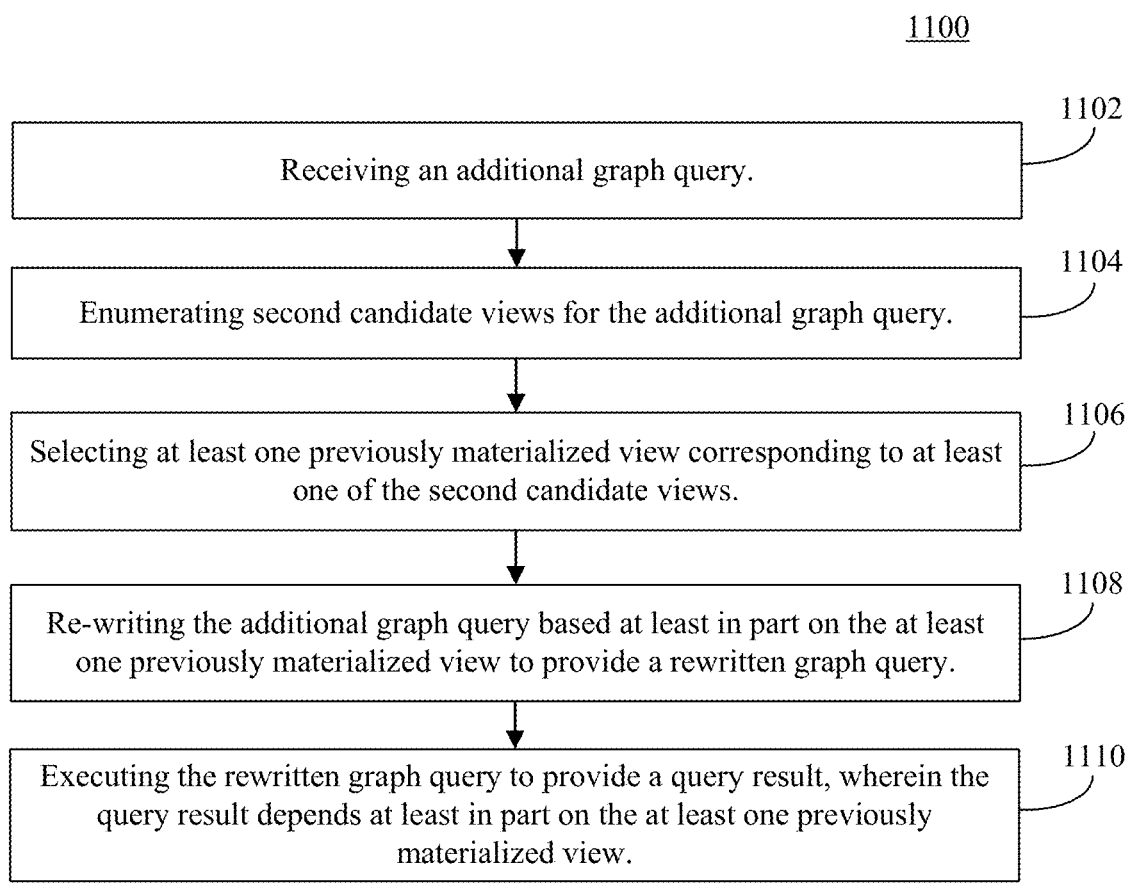
FIG. 11 depicts a flowchart providing an example method for query optimization using previously generated materialized views, accordingly to an embodiment.

FIG. 11 depicts an example method for query optimization using previously generated materialized views, accordingly to an embodiment. FIG. 11 is described with continued reference to system 600 of FIG. 6. However, other structural and operational embodiments will be apparent to persons skilled in the relevant art(s) based on the following discussion regarding flowchart 1100.

As shown in FIG. 11, flowchart 1000 begins at step 1102. In step 1102, an additional graph query is received. For example, and with continued reference to system 600 of FIG. 6, query rewriter 612 may be configured to receive ad-hoc query 614. Ad-hoc query 614 may represent, for example, a recommendation or similarity search query run by a user. As described in more detail below, embodiments are enabled to optimize the query execution to take advantage of previously materialized view(s).

At step 1104, second candidate views for the additional graph query are enumerated. For example, and with reference to system 600 of FIG. 6, and flowchart 700 of FIG. 7, view enumerator 610 may be configured to enumerate a set of candidate views for ad-hoc query 614. In embodiments, view enumerator 610 is configured receive ad-hoc query 614 from query rewriter 612, and to enumerate such candidate views in the same manner as described above in conjunction with step 708 in flowchart 700 of FIG. 7, and as further described in the discussion of Algorithm-1 (as discussed at section II.a). More specifically, view enumerator 610 may generate graph query facts for ad-hoc query 614, gather or re-compute graph schema facts and gather view template inference rules, and provide such facts and rules to an inference engine (e.g., Prolog) to generate second candidate views 632 which are returned to query rewriter 612.

Flowchart 1100 of FIG. 11 continues with step 1106. In step 1106, at least one previously materialized view corresponding to at least one of the second candidate views is selected. For example, and with continued reference to system 600 of FIG. 6, query rewriter 612 may be configured to receive second candidate views 632 enumerated by view enumerator 610, determine which of the candidate views 632 were previously materialized and are currently cached as materialized views 622 in graph database 616, and prune candidate views that are not available. Query rewriter 612 may, for each of the remaining candidate views, determine and select one or more of materialized views 622 having the highest evaluation cost (whether estimated or as actually measured during materialization). As discussed above, the view(s) having the highest evaluation costs is/are chosen since such costs represent the costs that will be avoided by using such materialized view(s).

At step 1108, the additional graph query is rewritten based at least in part on the at least one previously materialized view to provide a rewritten graph query. For example, and with continued reference to system 600 of FIG. 6, embodiments of query rewriter 612 may be configured to rewrite ad-hoc query 614 by substituting references to the materialized view(s) selected at step 1106 above for the appropriate portions of the original query. For example, and as discussed above, Query-2 is a rewritten version of Query-1, except with a 2-hop connector view substituted for the MATCH constraints in Query-1.

Flowchart 1100 of FIG. 11 concludes at step 1110. In step 1110, the rewritten graph query is executed to provide a query result, wherein the query result depends at least in part on the at least one previously materialized view. For example, and with continued reference to system 600 of FIG. 6, embodiments of query rewriter 612 may be configured to provide the rewritten query 640 to execution engine 624 for evaluation. embodiments of execution engine 624 may be configured to execute the re-written query, using the materialized view referenced by the re-written query, to generate a query result 636. It logically follows, that the query result so generated must in fact depend on that materialized view. In embodiments, query result 636 may be provided to query rewriter 612 for subsequent relay to the originator of ad-hoc query 614 (as shown in FIG. 6). Alternatively, query result 636 may be provided directly to the originator of ad-hoc query 614 (not shown).

III. Example Computer System Implementation

Workload analyzer 608, view enumerator 610, query rewriter 612, execution engine 624, graph database 616, and flowcharts 700, 800, 900, 1000, and/or 1100 may be implemented in hardware, or hardware combined with software and/or firmware. For example, workload analyzer 608, view enumerator 610, query rewriter 612, execution engine 624, graph database 616, and flowcharts 700, 800, 900, 1000 and/or 1100 may be implemented as computer program code/instructions configured to be executed in one or more processors and stored in a computer readable storage medium. Alternatively, workload analyzer 608, view enumerator 610, query rewriter 612, execution engine 624, graph database 616, and flowcharts 700, 800, 900, 1000, 1100 may be implemented as hardware logic/electrical circuitry.

For instance, in an embodiment, one or more, in any combination, of workload analyzer 608, view enumerator 610, query rewriter 612, execution engine 624, graph database 616, and flowcharts 700, 800, 900, 1000, and/or 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
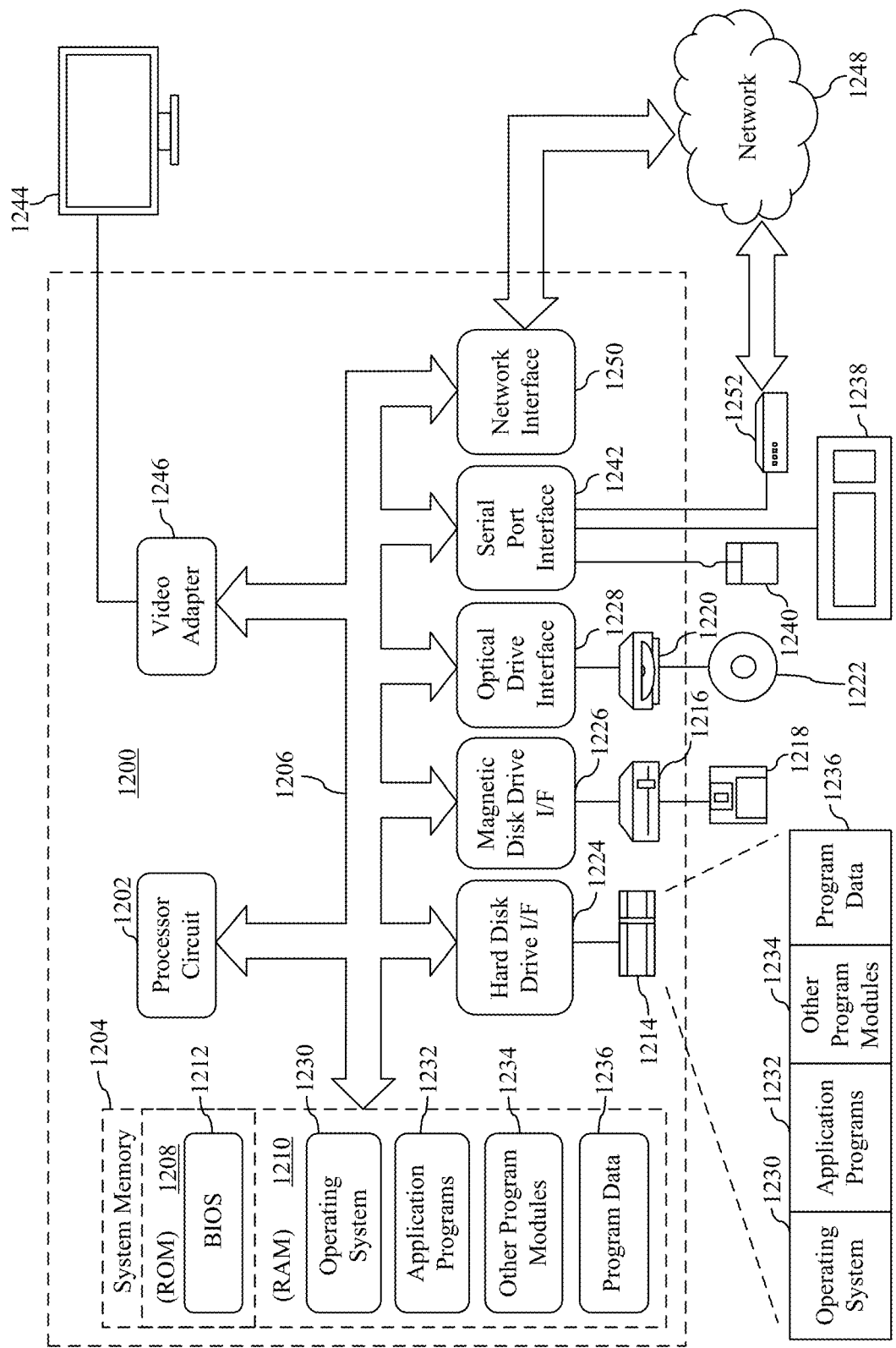
FIG. 12 is a block diagram of an example computer system in which embodiments may be implemented.

FIG. 12 depicts an exemplary implementation of a computing device 1200 in which embodiments may be implemented. For example, workload analyzer 608, view enumerator 610, query rewriter 612, execution engine 624 and/or graph database 616 may each be implemented in one or more computing devices similar to computing device 1200 in stationary or mobile computer embodiments, including one or more features of computing device 1200 and/or alternative features. The description of computing device 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing workload analyzer 608, view enumerator 610, query rewriter 612, execution engine 624, graph database 616, and flowcharts 700, 800, 900, 1000 and/or 1100 (including any suitable step of flowcharts 700, 800, 900, 1000 and/or 1100), and/or further embodiments described herein.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments described herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A computer-implemented method for generating materialized graph views of a graph, the graph being stored in a graph database according to a corresponding graph schema is described herein. The method includes: receiving a plurality of graph queries comprising a query workload; receiving one or more graph view templates comprising inference rules; determining graph query facts for each of the plurality of graph queries; enumerating sets of candidate views, each set of candidate views corresponding to a respective one of the plurality of graph queries, the candidate views of each set based at least in part on the graph query facts of the graph query corresponding to that set and the one or more graph view templates; selecting at least one candidate view from the sets of candidate views; and generating and storing a materialized view based at least in part on the selected at least one candidate view.

One embodiment of the foregoing method further comprises extracting graph structural properties of the graph based at least in part on the graph schema, and wherein the candidate views are further based at least in part on the graph structural properties.

An additional embodiment of the foregoing method further comprises generating for each graph query of the plurality of graph queries: a query evaluation cost estimate; and a candidate view performance improvement estimate for each candidate view of the sets of candidate views.

One embodiment of the foregoing method further comprises generating for each candidate view of the sets of candidate views: a view size estimate; and a view creation cost estimate; generating for each graph query of the plurality of graph queries: a query evaluation cost estimate; and a candidate view performance improvement estimate for each candidate view of the sets of candidate views.

In another embodiment of the foregoing method, the candidate view performance improvement estimate comprises a quotient of the view creation cost estimate for the respective one candidate view and the query evaluation cost estimate for the respective one of the graph queries of the plurality of graph queries.

In an additional embodiment of the foregoing method, the one or more graph view templates comprises at least one of: a summarizer; or a connector.

One embodiment of the foregoing method further comprises receiving an additional graph query; enumerating second candidate views for the additional graph query; selecting at least one previously materialized view corresponding to at least one of the second candidate views; re-writing the additional graph query based at least in part on the at least one previously materialized view to provide a rewritten graph query; and executing the rewritten graph query to provide a query result, wherein the query result depends at least in part on the at least one previously materialized view.

A system is described herein. In one embodiment, the system comprises: one or more processors; a graph database including at least one graph and a corresponding graph schema; and one or more memory devices accessible to the one or more processors, the one or more memory devices storing software components for execution by the one or more processors, the software components including: a workload analyzer configured to receive a plurality of graph queries comprising a query workload; a view enumerator configured to: receive one or more graph view templates comprising inference rules; determine graph query facts for each of the plurality of graph queries; and enumerate sets of candidate views, each set of candidate views corresponding to a respective one of the plurality of graph queries, the candidate views of each set based at least in part on the graph query facts of the graph query corresponding to that set and the one or more graph view templates; and wherein the workload analyzer is further configured to select at least one candidate view from the sets of candidate views; and an execution engine configured to generate and store at least one materialized view based at least in part the selected at least one candidate view.

In one embodiment of the foregoing system, the workload analyzer is further configured to, extract graph structural properties of the graph based at least in part on the graph schema, and the candidate views are further based at least in part on the graph structural properties.

In another embodiment of the foregoing system, the workload analyzer is further configured to, generate a view size estimate and a view creation cost estimate; and for each graph query of the plurality of graph queries: generate a query evaluation cost estimate; and generate a candidate view performance improvement estimate for each candidate view of the first candidate views.

In an additional embodiment of the foregoing system, the workload analyzer is further configured to: generate a workload performance improvement estimate for each candidate view of the sets of candidate views by calculating a sum of the candidate view performance improvement estimates corresponding to each graph query; and select the at least one candidate view from the sets of candidate views based at least in part on the workload performance improvement estimate of the at least one candidate view.

In one embodiment of the foregoing system, the candidate view performance improvement estimate comprises a quotient of the view creation cost estimate for the respective one candidate view and the query evaluation cost estimate for the respective one of the graph queries of the plurality of graph queries.

In another embodiment of the foregoing system, the one or more graph view templates comprises at least one of: a summarizer; or a connector.

In an additional embodiment of the foregoing system, the system further comprises a query rewriter and wherein the view enumerator is further configured to: enumerate second candidate views for an additional graph query received by the query rewriter, the query rewriter configured to: select at least one previously materialized view corresponding to at least one of the second candidate views; rewrite the additional graph query based at least in part on the at least one previously materialized view to provide a rewritten graph query; and the execution engine further configured to execute the rewritten graph query to provide a query result, wherein the query result depends at least in part on the at least one previously materialized view.

A computer program product comprising a computer-readable memory device having computer program logic recorded thereon that when executed by at least one processor of a computing device causes the at least one processor to perform operations for generating materialized graph views of a graph, the graph being stored in a graph database according to a corresponding graph schema is described herein. In one embodiment of the computer program product, the operations comprise: receiving a plurality of graph queries comprising a query workload; receiving one or more graph view templates comprising inference rules; determining graph query facts for each of the plurality of graph queries; enumerating sets of candidate views, each set of candidate views corresponding to a respective one of the plurality of graph queries, the candidate views of each set based at least in part on the graph query facts of the graph query corresponding to that set and the one or more graph view templates; and generating and storing at least one materialized view based at least in part on a candidate view selected from the first candidate views.

In one embodiment of the foregoing computer-readable memory device, the operations further comprise extracting graph structural properties of the graph based at least in part on the graph schema, and wherein the candidate views are further based at least in part on the graph structural properties.

In another embodiment of the foregoing computer-readable memory device, the operations further comprise generating for each candidate view of the first candidate views a view size estimate and a view creation cost estimate; and generating for each graph query of the plurality of graph queries: a query evaluation cost estimate; and a candidate view performance improvement estimate for each candidate view of the sets of candidate views.

In an additional embodiment of the foregoing computer-readable memory device, the operations further comprise: generating a workload performance improvement estimate for each candidate view of the sets of candidate views by calculating a sum of the candidate view performance improvement estimates corresponding to each graph query; selecting at least one candidate view from the sets of candidate views based at least in part on the workload performance improvement estimate of the at least one candidate view; and generating the at least one materialized view of the at least one candidate view.

In another embodiment of the foregoing computer-readable memory device, the candidate view performance improvement estimate comprises a quotient of the view creation cost estimate for the respective one candidate view and the query evaluation cost estimate for the respective one of the graph queries of the plurality of graph queries.

In an additional embodiment of the foregoing computer-readable memory device, the operations further comprise: receiving an additional graph query; enumerating second candidate views for the additional graph query; selecting at least one previously materialized view corresponding to at least one of the second candidate views; re-writing the additional graph query based at least in part on the at least one previously materialized view to provide a rewritten graph query; and executing the rewritten graph query to provide a query result, wherein the query result depends at least in part on the at least one previously materialized view.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A computer-implemented method for generating materialized graph views of a graph, the graph being stored in a graph database according to a corresponding graph schema, the method comprising:
   receiving a plurality of graph queries comprising a query workload;
   receiving one or more graph view templates comprising inference rules;
   determining graph query facts for each of the plurality of graph queries;
   enumerating sets of candidate views, each set of candidate views corresponding to a respective one of the plurality of graph queries, the candidate views of each set based at least in part on the graph query facts of the graph query corresponding to that set and the one or more graph view templates;
   selecting at least one candidate view from the sets of candidate views; and
   generating and storing a materialized view based at least in part on the selected at least one candidate view.

2. The method of claim 1 further comprising extracting graph structural properties of the graph based at least in part on the graph schema, and wherein the candidate views are further based at least in part on the graph structural properties.

3. The method of claim 1 further comprising:
   generating for each candidate view of the sets of candidate views:
     a view size estimate; and
     a view creation cost estimate;
   generating for each graph query of the plurality of graph queries:
     a query evaluation cost estimate; and
     a candidate view performance improvement estimate for each candidate view of the sets of candidate views.

4. The method of claim 3 further comprising:
   generating a workload performance improvement estimate for each candidate view of the sets of candidate views by calculating a sum of the candidate view performance improvement estimates corresponding to each graph query; and selecting the at least one candidate view from the sets of candidate views based at least in part on the workload performance improvement estimate of the at least one candidate view.

5. The method of claim 3 wherein the candidate view performance improvement estimate comprises a quotient of the view creation cost estimate for the respective one candidate view and the query evaluation cost estimate for the respective one of the graph queries of the plurality of graph queries.

6. The method of claim 1 wherein the one or more graph view templates comprises at least one of:
a summarizer; or
a connector.

7. The method of claim 1 further comprising:
receiving an additional graph query;
enumerating second candidate views for the additional graph query;
selecting at least one previously materialized view corresponding to at least one of the second candidate views;
re-writing the additional graph query based at least in part on the at least one previously materialized view to provide a rewritten graph query; and
executing the rewritten graph query to provide a query result, wherein the query result depends at least in part on the at least one previously materialized view.

8. A graph view enumeration, generation and query system, comprising:
one or more processors;
a graph database including at least one graph and a corresponding graph schema; and
one or more memory devices accessible to the one or more processors, the one or more memory devices storing software components for execution by the one or more processors, the software components including:
a workload analyzer configured to receive a plurality of graph queries comprising a query workload;
a view enumerator configured to:
receive one or more graph view templates comprising inference rules;
determine graph query facts for each of the plurality of graph queries; and
enumerate sets of candidate views, each set of candidate views corresponding to a respective one of the plurality of graph queries, the candidate views of each set based at least in part on the graph query facts of the graph query corresponding to that set and the one or more graph view templates; and
wherein the workload analyzer is further configured to select at least one candidate view from the sets of candidate views; and
an execution engine configured to generate and store at least one materialized view based at least in part the selected at least one candidate view.

9. The system of claim 8 wherein the view enumerator is further configured to extract graph structural properties of the graph based at least in part on the graph schema, and the candidate views are further based at least in part on the graph structural properties.

10. The system of claim 8 wherein the workload analyzer is further configured to:
for each candidate view of the sets of candidate views:
generate a view size estimate and a view creation cost estimate; and
for each graph query of the plurality of graph queries:
generate a query evaluation cost estimate; and
generate a candidate view performance improvement estimate for each candidate view of the first candidate views.

11. The system of claim 10 wherein the workload analyzer is further configured to:
generate a workload performance improvement estimate for each candidate view of the sets of candidate views by calculating a sum of the candidate view performance improvement estimates corresponding to each graph query; and
select the at least one candidate view from the sets of candidate views based at least in part on the workload performance improvement estimate of the at least one candidate view.

12. The system of claim 10 wherein the candidate view performance improvement estimate comprises a quotient of the view creation cost estimate for the respective one candidate view and the query evaluation cost estimate for the respective one of the graph queries of the plurality of graph queries.

13. The system of claim 8 wherein the one or more graph view templates comprises at least one of:
a summarizer; or
a connector.

14. The system of claim 8 further comprising a query rewriter and wherein the view enumerator is further configured to:
enumerate second candidate views for an additional graph query received by the query rewriter, the query rewriter configured to:
select at least one previously materialized view corresponding to at least one of the second candidate views;
rewrite the additional graph query based at least in part on the at least one previously materialized view to provide a rewritten graph query; and
the execution engine further configured to execute the rewritten graph query to provide a query result, wherein the query result depends at least in part on the at least one previously materialized view.

15. A computer program product comprising a computer-readable memory device having computer program logic recorded thereon that when executed by at least one processor of a computing device causes the at least one processor to perform operations for generating materialized graph views of a graph, the graph being stored in a graph database according to a corresponding graph schema, the operations comprising:
receiving a plurality of graph queries comprising a query workload;
receiving one or more graph view templates comprising inference rules;
determining graph query facts for each of the plurality of graph queries;
enumerating sets of candidate views, each set of candidate views corresponding to a respective one of the plurality of graph queries, the candidate views of each set based at least in part on the graph query facts of the graph query corresponding to that set, the one or more graph view templates, and the graph structural properties; and
generating and storing at least one materialized view based at least in part on a candidate view selected from the first candidate views.

16. The computer program product of claim 15 wherein the operations further comprise extracting graph structural properties of the graph based at least in part on the graph schema, and wherein the candidate views are further based at least in part on the graph structural properties.

17. The computer program product of claim 16 wherein the operations further comprise:
generating for each candidate view of the first candidate views a view size estimate and a view creation cost estimate; and
generating for each graph query of the plurality of graph queries:
a query evaluation cost estimate; and
a candidate view performance improvement estimate for each candidate view of the sets of candidate views.

18. The computer program product of claim 17, the operations further comprise:
generating a workload performance improvement estimate for each candidate view of the sets of candidate views by calculating a sum of the candidate view performance improvement estimates corresponding to each graph query;
selecting at least one candidate view from the sets of candidate views based at least in part on the workload performance improvement estimate of the at least one candidate view; and
generating the at least one materialized view of the at least one candidate view.

19. The computer program product of claim 17 wherein the candidate view performance improvement estimate comprises a quotient of the view creation cost estimate for the respective one candidate view and the query evaluation cost estimate for the respective one of the graph queries of the plurality of graph queries.

20. The computer program product of claim 15, the operations further comprise:
receiving an additional graph query;
enumerating second candidate views for the additional graph query;
selecting at least one previously materialized view corresponding to at least one of the second candidate views;
re-writing the additional graph query based at least in part on the at least one previously materialized view to provide a rewritten graph query; and
executing the rewritten graph query to provide a query result, wherein the query result depends at least in part on the at least one previously materialized view.

* * * * *